US006463190B1

(12) United States Patent
Kato et al.

(10) Patent No.: US 6,463,190 B1
(45) Date of Patent: Oct. 8, 2002

(54) OPTICAL SWITCH AND METHOD OF MAKING THE SAME

(75) Inventors: Yoshichika Kato; Keiichi Mori, both of Tokyo (JP)

(73) Assignee: Japan Aviation Electronics Industry Limited, Tokyo (JP)

(*) Notice: Subject to any disclaimer, the term of this patent is extended or adjusted under 35 U.S.C. 154(b) by 0 days.

(21) Appl. No.: 09/519,883

(22) Filed: Mar. 6, 2000

(30) Foreign Application Priority Data

| | | |
|---|---|---|
| Oct. 16, 1998 | (JP) | 10-295037 |
| Mar. 4, 1999 | (JP) | 11-057427 |
| Mar. 5, 1999 | (JP) | 11-058297 |

(51) Int. Cl.[7] .................... G02B 6/26

(52) U.S. Cl. .................... 385/16; 385/8; 385/22

(58) Field of Search .................... 385/8, 16, 22, 385/23

(56) References Cited

U.S. PATENT DOCUMENTS

| | | | | | |
|---|---|---|---|---|---|
| 4,773,721 | A | * | 9/1988 | Erman et al. | 350/96.13 |
| 4,925,264 | A | * | 5/1990 | Erman et al. | 350/96.13 |
| 5,594,820 | A | | 1/1997 | Garel-Jones et al. | 385/22 |
| 5,923,798 | A | * | 7/1999 | Aksyuk et al. | 385/19 |
| 6,134,207 | A | * | 10/2000 | Jerman et al. | 369/112 |
| 6,379,510 | B1 | * | 4/2002 | Kane et al. | 204/192.34 |

FOREIGN PATENT DOCUMENTS

| | | | |
|---|---|---|---|
| DE | 38 17 035 | | 8/1989 |
| EP | 0 219 358 | | 4/1987 |
| JP | 02000258702 A | * | 9/2000 |
| JP | 02000258704 A | * | 9/2000 |
| JP | 02000352676 A | * | 12/2000 |
| JP | 02001042233 A | * | 2/2001 |

OTHER PUBLICATIONS

Boysel, R.M., et al., "Integration of Deformable Mirror Devices with Optical Fibers and Waveguides," *SPIE*, vol. 1793, Integrated Optics and Microstructures, 1992, pp. 34–39.

* cited by examiner

*Primary Examiner*—Akm E. Ullah
*Assistant Examiner*—Jennifer Doan
(74) *Attorney, Agent, or Firm*—Connolly Bove Lodge & Hutz LLP

(57) ABSTRACT

An optical switch in which a conductive silicon substrate is coated all over the surface area with a silicon film to form in parallel to the substrate surface a movable contact and elastic support portions for coupling the movable electrode and for elastically supporting its movable electrode in a manner to be displaced vertically. The surface region of the conductive silicon substrate facing the movable electrode and the elastic support portions is etched away to form therein a low-floor portion as a fixed electrode surface opposite the movable electrode in parallel thereto. A micro mirror having a vertical reflecting surface is mounted on the movable electrode portion.

35 Claims, 14 Drawing Sheets

10 14a 15A 19a 18a 17a 12 15B 11 13 15C 14b 19c 19b 18b 17b 10
11
12
13
14a
14b
15A
15B
15C
17a
17b
18a
18b
19a
19b
19c 22a
23a
23c
22c
32a
32
24
22d
22d
21
32d
23d
23d
32d 22a
40
23c
22c
24
23a
23b
22d
23d
22b

OPTICAL SWITCH AND METHOD OF MAKING THE SAME

BACKGROUND OF THE INVENTION

The present invention relates to an optical switch for use in optical communication systems or the like and a method of making the same.

With recent developments of optical networks, optical switches are now receiving attention as optical devices of the utmost importance. Also there is a demand for their miniaturization in accordance with the present trend toward increasingly high-capacity optical networks. To meet the demand, a miniaturized optical switch has been proposed which has a movable switching portion formed using micro-machine technology. Its structure is depicted in FIG. 1. Reference numeral 10 denotes a silicon (Si) substrate having a groove cut therein by micromachining, wherein there are formed a pair of parallel cantilevers 14*a* and 14*b* coupled together at their free ends. Fixedly disposed on the substrate 10 near opposite ends of the cantilevers 14*a* and 14*b* lengthwise thereof are guide blocks 11 and 13. Disposed adjacent the guide block 13 is another guide block 12 formed integrally with the cantilever free end coupling portion. The guide block 12 is coated over the entire area of its surface or underside with a soft magnetic film 19*c*. These guide blocks 11, 12 and 13 have the same height.

An optical fiber 15A is fixed its one end on the guide block 12 and extended and supported across the top of the guide block 11. Two optical fibers 15B and 15C are fixed at one end in parallel to the guide block 13. On the substrate 10 there are mounted magnetic yokes 19*a* and 19*b* at both sides of the guide block 12, the magnetic yokes 19*a* and 19*b* having wound thereon coils 17*a* and 17*b*, respectively. The magnetic yokes 19*a* and 19*b* are split centrally thereof and have permanent magnets 18*a* and 18*b* inserted between the gaps, respectively.

With the optical switch of such a construction as described above, the application of a driving voltage to, for example, the coil 17*a* causes it to attract the soft magnetic film 19*c* coated on the guide block 12 to resiliently bend the cantilevers 14*a* and 14*b* toward the magnetic yoke 19*a*, bringing the light-emitting end of the optical fiber 15A to the position where it stands opposite the light-receiving end of the optical fiber 15B. On the contrary, the voltage application to the coil 17*b* of the yoke 19*b* causes the light-emitting end of the optical fiber 15A to stand opposite the light-receiving end of the optical fiber 15C. In this way, light emitted from the optical fiber 15A can selectively be launched into the optical fibers 15B and 15C.

The manufacture of such a conventional optical switch encounters a difficulty in the miniaturization of the magnetic yokes 19*a* and 19*b* with the coils 17*a* and 17*b* wound thereon; for example, the substrate 10 inevitably becomes as large as 20 by 17 mm or so. It has also been proposed to miniaturize the optical switch by forming optical waveguides in the cantilevers 14*a* and 14*b* in FIG. 1, but the proposed optical switch structure still electromagnetically drives the cantilevers and measures about 16 by 18 mm. Besides, the proposed optical switch has a defect that the insertion loss of the waveguide is as large as several dB.

SUMMARY OF THE INVENTION

It is therefore an object of the present invention to provide an optical switch that can be driven at a low voltage and hence can be miniaturized, and a method of making such an optical switch.

The optical switch according to the present invention comprises:

substrate means;

fixed electrode means fixedly secured to the substrate means with the surface of the fixed electrode means held lower than and in parallel to the surface of the substrate means;

movable electrode means disposed opposite to the fixed electrode means in spaced relation thereto;

elastic support means for coupling the movable electrode means and the substrate means and for elastically supporting the movable electrode means so that the movable electrode means can be displaced vertically to the surface of the fixed electrode means; and optical path switching means provided on the surface of the movable electrode means opposite the fixed electrode means and having a light receiving surface vertical to the surface of the movable electrode means;

wherein, by ON-OFF control of voltage application across the movable electrode means and the fixed electrode means, the movable electrode means is displaced toward the fixed electrode means and returned to its normal position to selectively switch the optical path of an incident light beam by the optical path switching means.

The method of the present invention for making an optical switch in which an optical path switching element mounted on a movable electrode is displaced to switch the optical path of an incident light beam, the method comprising the steps of:

(a) forming on a silicon substrate a pattern containing a movable electrode portion and an elastic support portion coupled thereto by a conductive silicon film;

(b) making an opening by etching away that region of the silicon substrate which is opposite to at least the movable electrode portion and the elastic support portion;

(c) attaching a conductive substrate to the underside of the silicon substrate so that one surface region of the conductive substrate serves as a fixed electrode opposite but spaced apart from at least the movable electrode portion in said opening; and (d) forming the optical path switching element on the movable electrode portion.

DETAILED DESCRIPTION OF THE PREFERRED EMBODIMENTS

Figure 1:
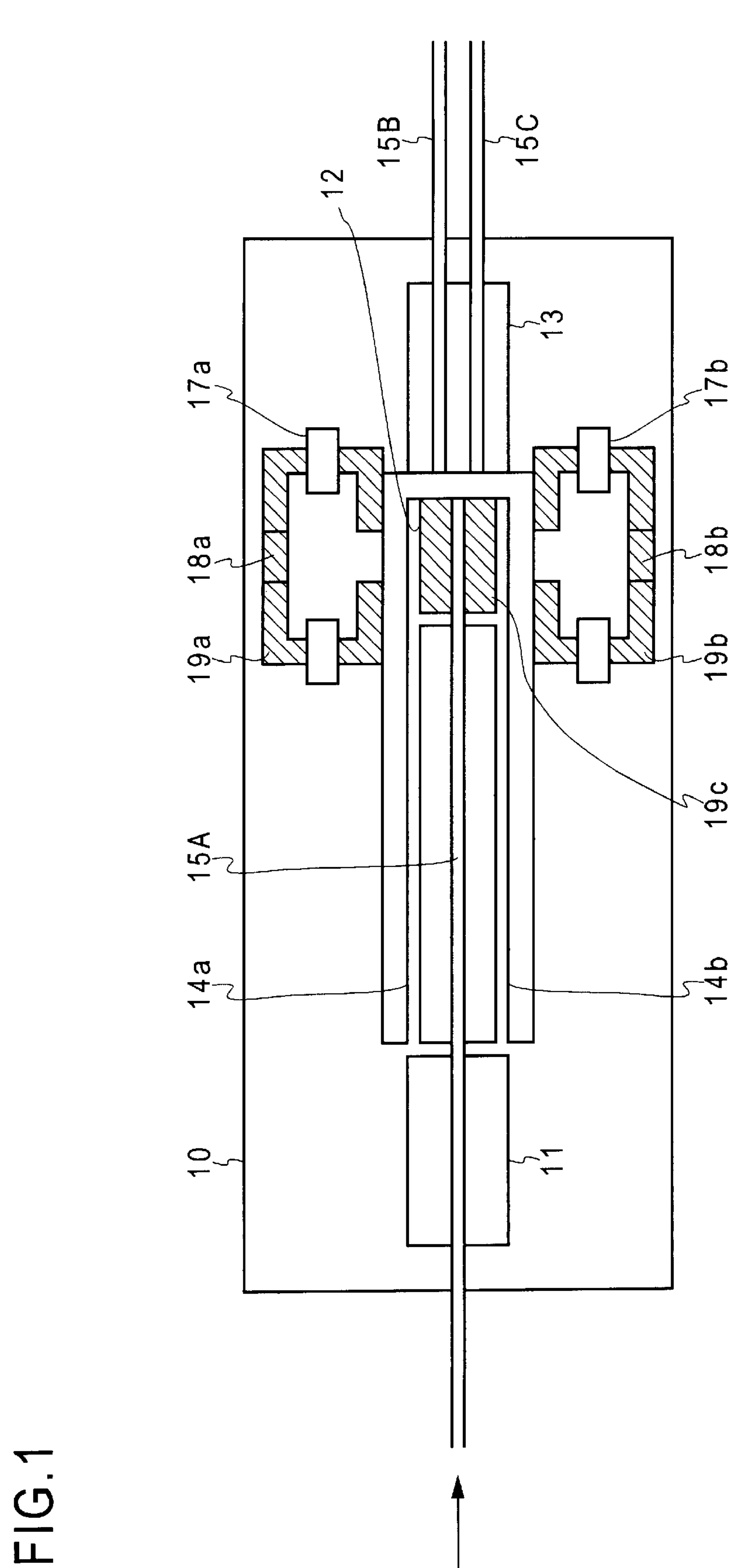
FIG. 1 is a plan view depicting an example of a conventional optical switch.

The optical switch according to the present invention has a basic structure wherein: a movable electrode is elastically held in an opening of a frame-like substrate; a mirror is fixedly mounted on the movable electrode at right angles to the electrode surface; a fixed electrode is mounted on the substrate in opposed but spaced relation to the underside of the movable electrode; a driving voltage is applied across the movable and the fixed electrode to attract the former toward the latter by electrostatic force; and the optical path from the light-emitting end of a first optical fiber to the light-receiving end of a second optical fiber is switched ON and OFF by the mirror mounted on the movable electrode.

FIRST EMBODIMENT

FIGS, 2A and 2B are plan and sectional views of an optical switch 20 according to a first embodiment of the present invention. In an opening 21 a of, for example, a rectangular-frame-shaped silicon (Si) substrate 21A, a movable electrode 24 of a rectangular shape in this example is placed in parallel to the substrate 21 A with two opposite sides of the electrode 24 coupled to stationary portions 22*a* and 22*b* on the frame-shaped substrate 21A through elastic supports portions 23*a* and 23*b*, respectively. Supported by the flexible elastic support portions 23*a* and 23*b*, the movable electrode 24 is allowed to move vertically with respect to the substrate surface. On the movable electrode 24 there is mounted a micro mirror 25 with its reflecting surface held at right angles to the movable electrode surface.

On the other hand, the opening 21*a* of the substrate 21A is stopped up from the underside thereof with a conductive substrate 21B that is disposed as a fixed electrode in opposed but spaced relation to the surface region of the substrate 21 A which contains the movable electrode 24 and the support portions 23*a* and 23*b*.

In this embodiment the conductive substrate 21B is machined to conform to the opening 21*a* and bonded to the substrate 21A from the underside thereof. The top of the conductive substrate 21B fitted in the opening 21*a*, that is, the fixed electrode surface is held at a predetermined level below the underside of the substrate 21A—this provides the maximum amount of displacement for the movable electrode 24 that allows the micro mirror 25 to move up and down to inhibit and permit the passage of a light beam.

In the optical switch 20 of such a construction the stationary portions 22*a*, 22*b*, the elastic support portions 23*a*, 23*b* and the movable electrode 24 are integrally formed of the same conductive material such as polysilicon. By applying a voltage across the movable electrode 24 and the conductive substrate 21B, the former is displaced toward the latter by electrostatic force so that the micro mirror 25 standing upright on the movable electrode 24 moves vertically with respect to the substrate surface to thereby switch the optical path of a light beam incoming from the direction parallel to the substrate surface.

Figure 2A:
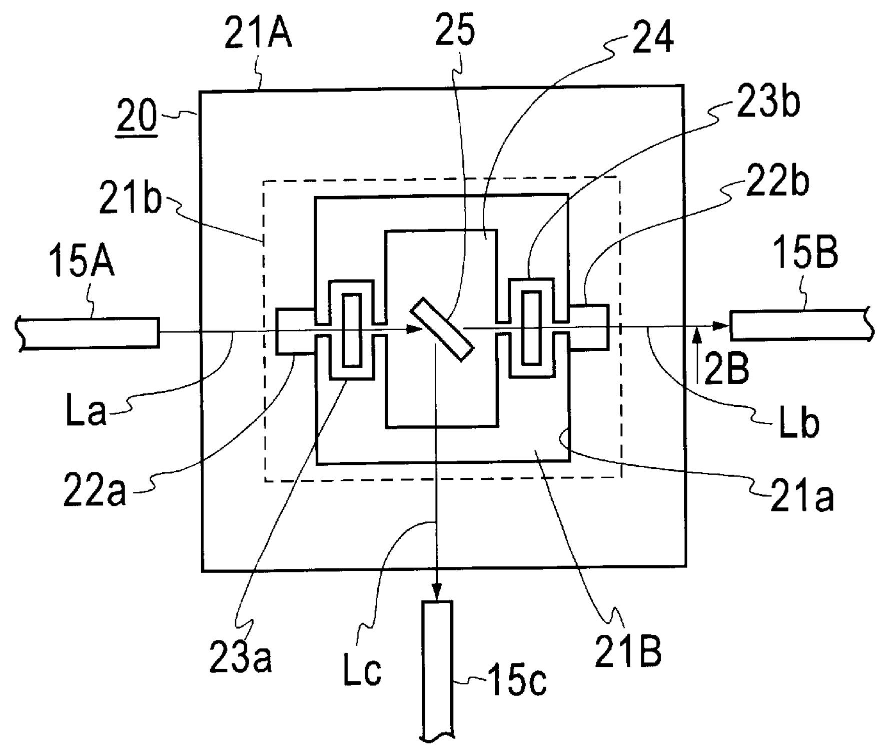
FIG. 2A is a plan view illustrating an optical switch according to a first embodiment of the present invention.

In FIG. 2A, reference numerals 15A, 15B and 15C denote optical fibers disposed, for instance, around the optical switch 20, La light incident on the optical switch 20, and Lb and Lc light emitted or emerged from the optical switch 20. When inserted in the optical path, the micro mirror 25 reflects the incident light La and launches the reflected light Lc into the optical fiber 15C. When the micro mirror 25 is displaced toward the fixed electrode side stays out of the optical path, the incoming light La is launched intact as the outgoing light Lc into the optical fiber 15*b*.

Figure 2B:
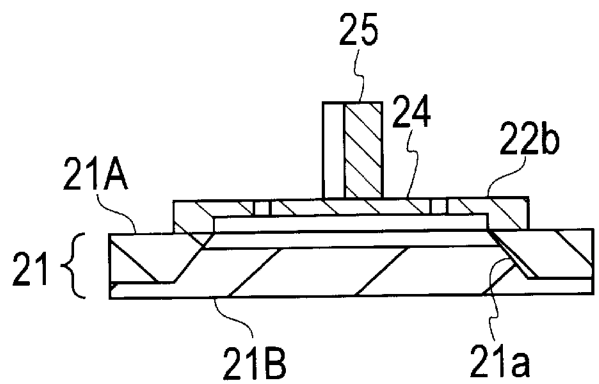
FIG. 2B is a sectional view taken along the line 2B—2B in FIG. 2A.
Figure 3A:
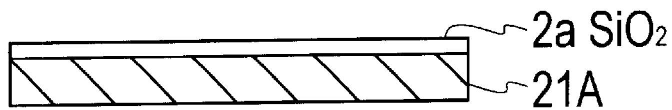
FIGS. 3A, 3B, 3C, 3D, 3E, 3F, 3G, 3H and 3I are sectional views showing a sequence of steps involved in the manufacture of the optical switch according to the first embodiment.
Figure 3B:
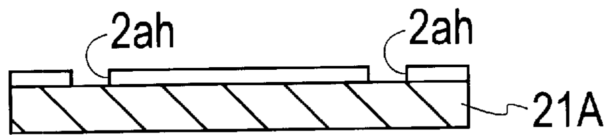
Figure 3C:
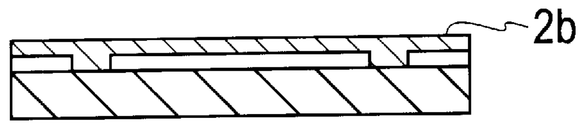
Figure 3D:
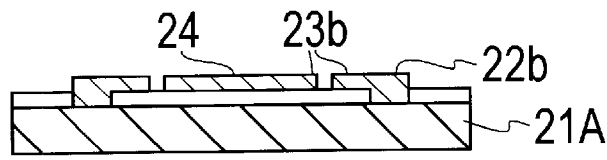
Figure 3E:
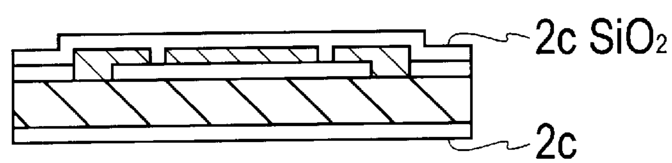
Figure 3F:
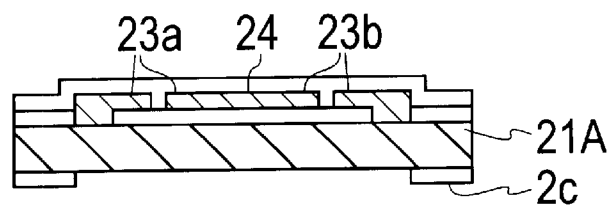
Figure 3G:
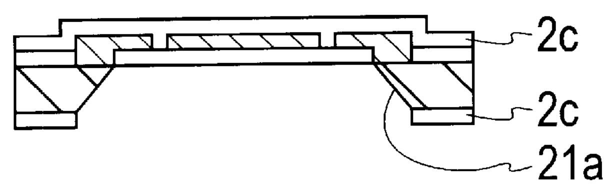
Figure 3H:
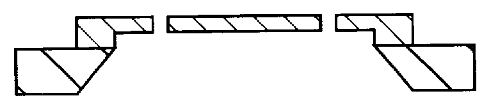
Figure 3:
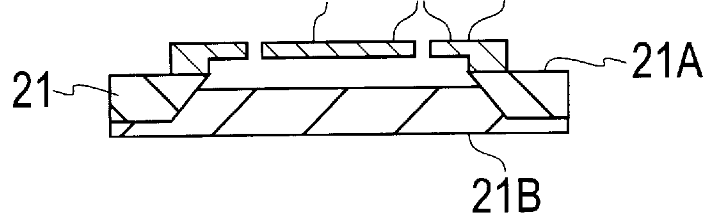

FIG. 3 illustrates, in section, a sequence of steps involved in the manufacture of the optical switch 20 depicted in FIGS. 2A and 2B. A description will be given below of each step of fabrication.

Step S1 (FIG. 3A): A silicon substrate of a square configuration, in this example, is prepared as the substrate 21A, which is then coated all over its surface with an $SiO_2$ protective film 2*a* about 1 $\mu$m thick.

Step S2 (FIG. 3B): The protective film 2*a* is selectively etched away to make holes 2*ah* measuring, for example, approximately 100 by 100 $\mu$m, where the stationary portions 22*a* and 22*b* will ultimately be formed.

Step S3 (FIG. 3C): A conductive polysilicon film 2*b* is formed to a thickness of about 3 $\mu$m over the entire surface area of the $SiO_2$ film 2*a* including the holes 2*ah* for the purpose of forming the stationary portions 22*a*, 22*b*, the elastic support portions 223*a*, 23*b* and the movable electrode 24 as a unitary structure with one another. The conductive polysilicon film 2*b* is a P-type one with boron (B) thermally diffused thereinto.

Step S4 (FIG. 3D): The polysilicon film 2*b* is selectively etched away to form the movable electrode 24, the elastic support portions 23*a*, 23*b* and the stationary portions 22*a*, 22*b*.

Step S5 (FIG. 3E): An $SiO_2$ protective film 2*c* is formed all over the top and underside of the substrate assembly.

Step S6 (FIG. 3F): The protective film 2*c* is selectively etched away that region of the underside of the substrate 21A (a broken-line area 21b in FIG. 2A) which corresponds to the movable electrode 24 and the elastic support portions 23*a* and 23*b*.

Step S7 (FIG. 3G): The substrate 21A is subjected to anisotropic etching using a KOH solution to form the opening 21*a*.

Step S8 (FIG. 3H): The remaining protective films 2*a* and 2*c* are removed.

Step S9 (FIG. 3I): The conductive substrate 21B machined as required to form the fixed electrode is fitted into the opening 21*a* and bonded to the substrate 21A from the underside thereof. The conductive substrate 21B in this example is an N-type conductive silicon substrate.

Finally, though not shown, the micro mirror 25 is placed on the movable electrode 24. The micro mirror 25 is formed by: depositing a metal land as a plating seed at the position where to form the micro mirror 25 on the movable electrode 24, for example, in FIG. 3I; coating a resist film all over the substrate surface to a thickness a little higher than the height of the micro mirror 25 to be formed; selectively etching away the resist film to make a hole that has a shape corresponding to the micro mirror 25 to be formed and extends down to the metal land; filling the hole with gold (Au), nickel (Ni), or similar metal by plating; and removing the resist film to form the micro mirror 25 on the movable electrode 24. For example, in the optical witch module described later on, a gold block of a size measuring 45 by 200 by 40 $\mu$m is formed as the micro mirror. Alternatively, the micro mirror may be obtained by forming a mirror support panel of a resist on the movable electrode 24 at the position where to form the micro mirror and then vapor evaporating gold, nickel, or like metal onto the support panel.

As described above, the optical switch according to the present invention, depicted in FIGS. 2A and 2B, utilizes electrostatic drive in place of electromagnetic one, and hence it need not be provided with the magnetic yokes 19*a*, 19*b*, the coils 17*a*, 17*b* and the permanent magnets 18*a*, 18*b* shown in FIG. 1; therefore, the optical switch of the present invention can be made smaller accordingly.

SECOND EMBODIMENT

With the structure in which the opening 21*a* is formed by selectively etching away the substrate 21A from the underside thereof and the conductive substrate is bonded to the opening 21*a* from the underside of the substrate 21A as described above, the substrate 21A has a frame-like configuration and hence needs to have a frame width large enough to provide sufficient mechanical strength of the substrate itself and sufficient area for bonding thereto the substrate 21B. To meet the requirements, it is necessary that outer dimensions of the optical switch 20 be designed a little large relative to the device area surrounded by the broken line 21*b* in FIG. 2A. In the case of using a silicon (Si) substrate as the substrate 21A and forming therein the opening 21*a* by anisotropic etching, the area of the opening 21*a* in the underside of the substrate 21A needs to be made particularly large since the inner face of the opening 21*a* is tapered as depicted in FIG. 2B. This makes the substrate 21A larger and constitutes an obstacle to the downsizing of the optical switch.

Moreover, the bonding of the conductive substrate 21B inevitably decreases the accuracy of fabrication, and it cannot be said that positioning accuracy of the top of the conductive substrate 21B, that is, positioning accuracy of the fixed electrode surface is high.

Besides, the fabrication of the above optical switch involves the bonding step in addition to the series of film forming and etching steps, and hence it is complex in process and time- and labor-consuming. A description will be given below of optical switch structures intended to overcome such disadvantages.

In the second embodiment of the invention, a movable electrode is mounted on a conductive substrate in parallel to the substrate surface and is made displaceable at right angles to the substrate surface, and a micro mirror is mounted on the movable electrode. A low-floor portion is formed in the substrate surface by etching, and the bottom of the low-floor area is used as the fixed electrode surface that is opposite and parallel to the movable electrode.

Figure 4A:
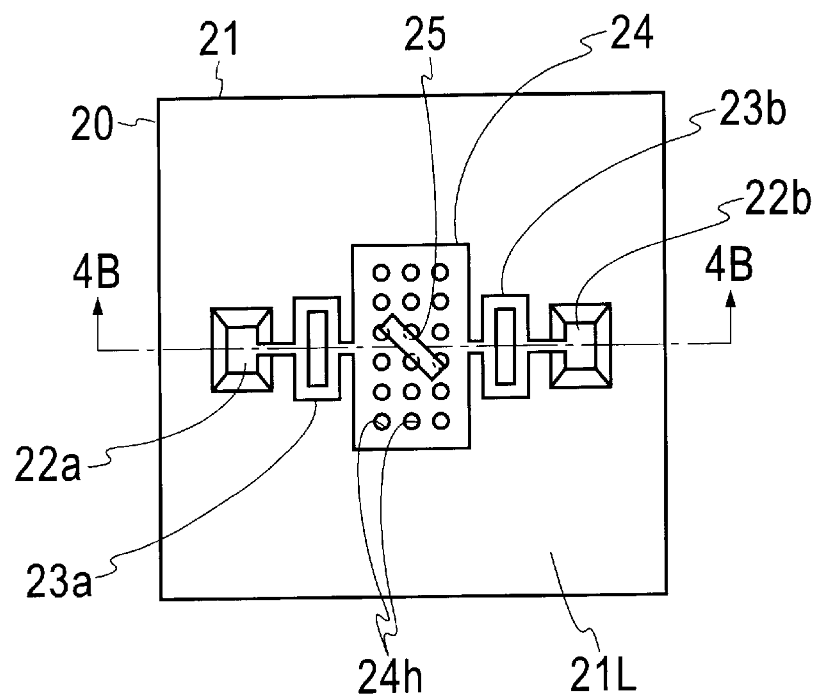
FIG. 4A is a plan view illustrating an optical switch according to a second embodiment of the present invention.
Figure 4B:
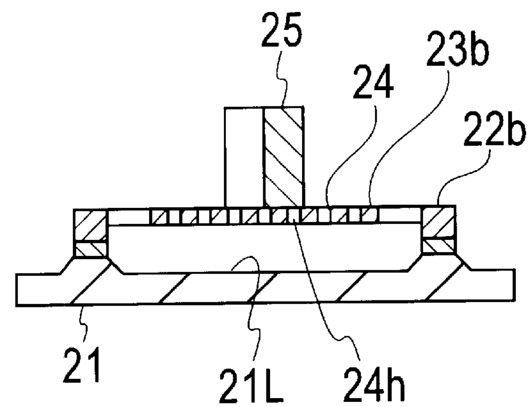
FIG. 4B is a sectional view taken along the line 4B—4B in FIG. 4A.
Figure 5A:
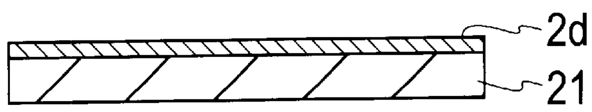
FIGS. 5A, 5B, 5C, 5D, 5E, 5F, 5G, 5H and 5I are sectional views showing a sequence of steps involved in the manufacture of the optical switch according to the second embodiment.
Figure 5B:
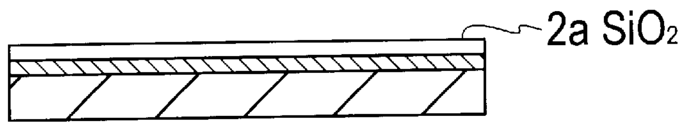
Figure 5C:
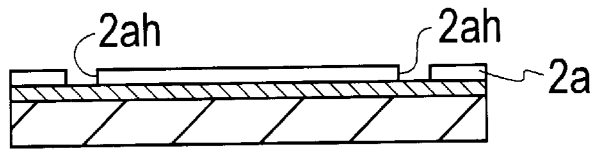
Figure 5D:
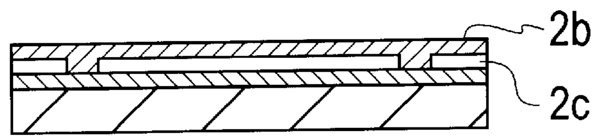
Figure 5E:
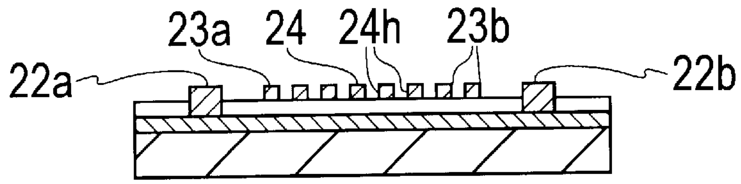
Figure 5F:
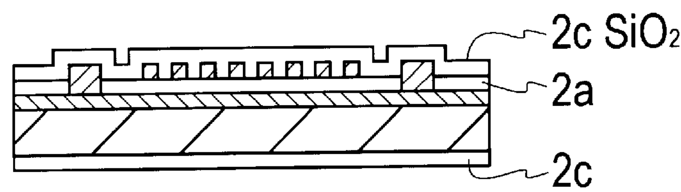
Figure 5G:
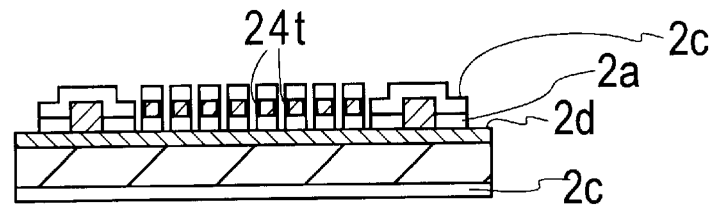
Figure 5H:
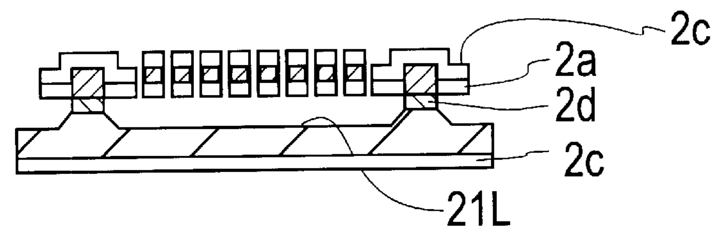
Figure 5I:
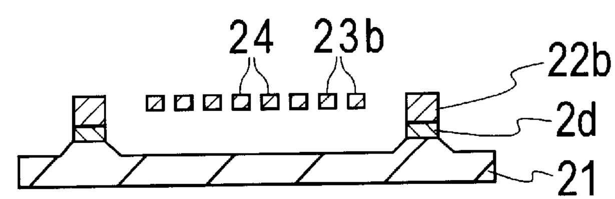

FIGS. 4A and 4B depict the optical switch according to the second embodiment, wherein the parts corresponding to those in FIGS. 2A and 2B are identified by the same reference numerals. In this embodiment the substrate 21 is formed of a conductive material and has a low-floor portion 21L formed in its surface by etching, and the floor surface of the low-floor portion 21L constitutes the fixed electrode surface adjacent but parallel to the movable electrode 24; namely, the substrate 21 serves a fixed electrode. The movable electrode 24 is supported on the substrate 21 by the elastic support portions 23*a* and 23*b* formed integrally with the electrode 24 as in the first embodiment shown in FIGS. 2A and 2B. Mounted on the movable electrode 24 is the micro mirror 25.

Referring next to FIGS. 5A through 5I, a description will be given of a method for making the optical switch depicted in FIGS. 4A and 4B.

Step S1 (FIG. 5A): For example, an N-type conductive silicon substrate 21 of a square configuration is coated all over its top surface with a P-type conductive polysilicon film 2*d* with boron (B) thermally diffused thereinto.

Step S2 (FIG. 5B): An $SiO_2$ protective film 2*a* is formed all over the surface of the polysilicon film 2*d*.

Step S3 (FIG. 5C): The protective film 2*a* is selectively removed to make therein holes 2*ah* at those positions where to form the stationary portions 22*a* and 22*b*.

Step S4 (FIG. 5D): A P-type conductive polysilicon film 2*b* is formed all over the surface of the protective film 2*a* including the exposed areas 2*ah*.

Step S5 (FIG. 5E): The P-type conductive polysilicon film 2*b* is selectively etched away to form the movable electrode 24, the elastic support portions 23*a*, 23*b* and the stationary portions 22*a*, 22*b*. At this time, a plurality of through holes 24*h* are bored in matrix form through the movable electrode 24 as depicted in FIG. 4A.

Step S6 (FIG. 5F): An $SiO_2$ protective film 2*c* is formed over the entire areas of the top and underside of the substrate assembly.

Step S7 (FIG. 5G): The $SiO_2$ films 2*a* and 2*c* on the upper side (on the side near the movable electrode 24) of the substrate assembly are patterned to form through holes 24*t* which extend down to the polysilicon film 2*d* in alignment with the through holes 24*h* of the movable electrode 24. At the same time, the SiO2 films 2*a* and 2*c* are patterned so that their outside shape becomes slightly larger than the outside shape of the movable electrode 24 and the elastic support portions 23*a*, 23*b* but larger than the outside shape of the stationary portions 22*a* and 22*b* as required.

Step S8 (FIG. 5H): The substrate 21 is etched using a KOH solution. The KOH solution flows to the polysilicon film 2*d* through the through holes 24*t*, by which the polysilicon film 2*d* of an isotropic etching property is etched away to expose the silicon substrate 21, which also undergo anisotropic etching to form the low-floor portion 21L. Incidentally, the polysilicon film 2*d* underlying he stationary portions 22*a* and 22*b* is covered with the protective films 2*a* and 2*c* which are sufficiently thicker than the film 2*d* as referred to above, and hence the polysilicon film 2*d* remains unetched (that is, the thickness of the polysilicon film 2*d* and the mask pattern diameters of the protective films 2*a* and 2*c* overlying the stationary portions 22*a* and 22*b* are determined accordingly).

Step S9 (FIG. 5I): The protective films 2*a* and 2*c* are removed.

This is followed, though not shown, by placing the micro mirror 25 on the movable electrode 24 to complete the optical switch 20. The micro mirror 25 is formed by the same method as described previously with respect to the first embodiment.

In step S1 described above, the boron (B) thermally diffused into the polysilicon film 2*d* diffuses down to the surface region of the N-type silicon substrate 21 to form a PN junction. Accordingly, when a DC driving voltage is applied across the movable electrode 24 and the silicon substrate 21 with the former negative with respect to the latter, the PN junction becomes reverse-biased, inhibiting the passage of DC current through the stationary part 22 and the polysilicon film 2*d*.

With the manufacturing method described above, after the formation of the movable electrode 24, the elastic support portions 23*a*, 23*b* and so forth, the low-floor portion 21L deep enough to allow displacement of the movable electrode 24 can be formed in the substrate 21 by selectively etching it away from the side where the above-mentioned elements have been provided. And the bottom of the low-floor area 21L serves as the fixed electrode surface opposite to the movable electrode 24.

Thus, this embodiment dispenses with the bonding step needed in the manufacture of the optical switch 20 of the FIG. 2 embodiment, and hence it permits accurate and easy fabrication of the optical switch accordingly.

Besides, since there is no need of forming the opening 21*a* in the substrate 21A as shown in FIGS. 2A and 2B, that is, since the substrate 21 is not frame-shaped, the region needed for providing the required frame width becomes unnecessary, making the optical switch 20 smaller accordingly.

Figure 6:
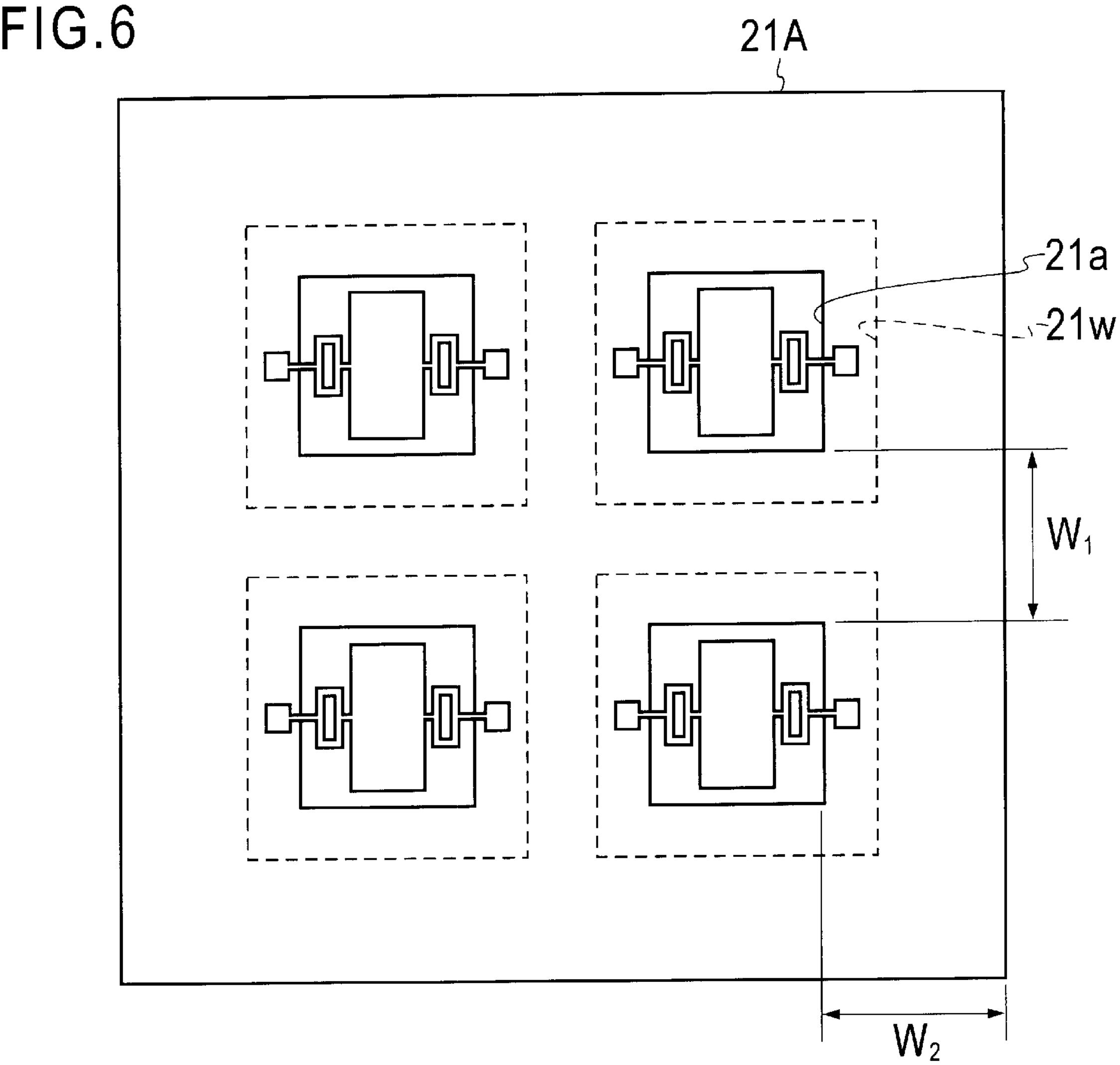
FIG. 6 is a plan view of a matrix switch array using optical switches according to the first embodiment.
Figure 7:
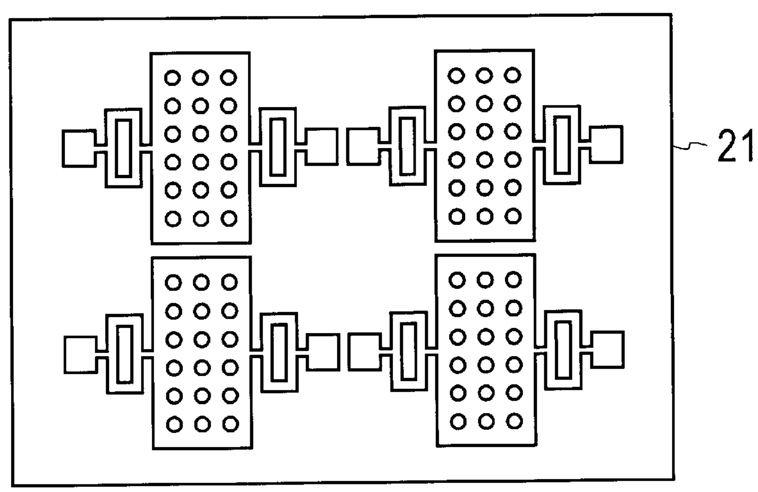
FIG. 7 is a plan view of a matrix switch array using optical switches according to the second embodiment.
Figure 8A:
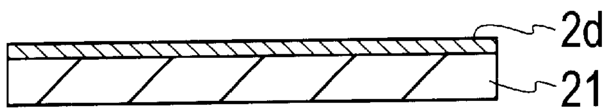
FIGS. 8A, 8B, 8C, 8D, 8E, 8F, 8G and 8H are sectional views depicting a sequence of steps involved in the manufacture of a modified form of the optical switch according to the second embodiment.
Figure 8B:
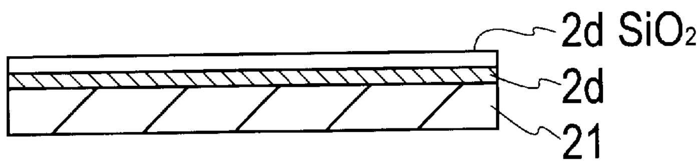
Figure 8C:
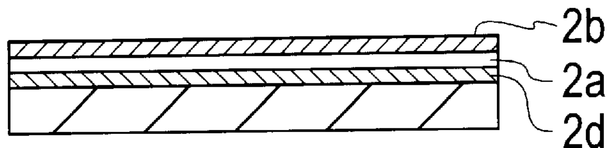
Figure 8D:
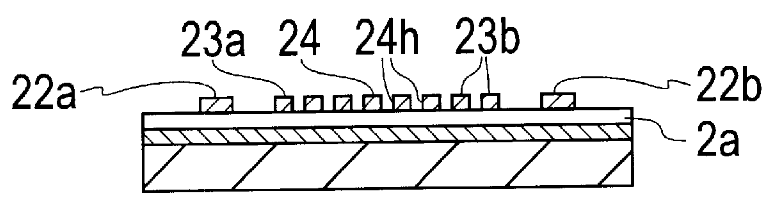
Figure 8E:
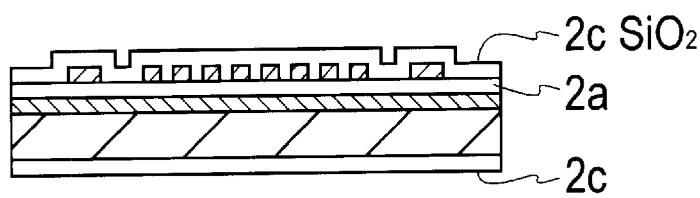
Figure 8F:
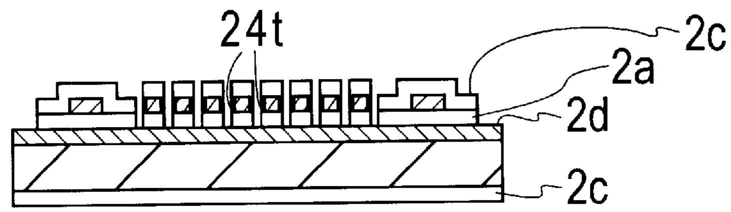
Figure 8G:
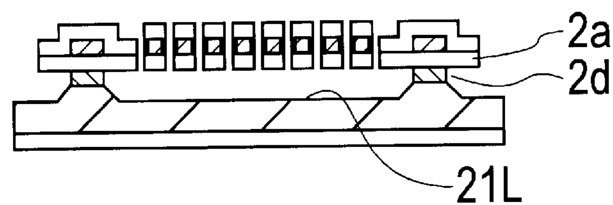
Figure 8H:
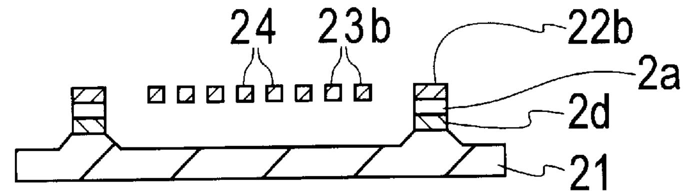

FIGS. 6 and 7 conceptually show the difference in size between two-by-two arrays of optical switches of the FIG. 2 and the FIG. 4 structure, respectively.

In the case of FIG. 6, when the opening 21*a* is formed by anisotropic etching in the substrate 21A of, for example, 400 μm thick, the formation of the opening 21*a* measuring 1 by 1 mm in the substrate surface requires the formation of an approximately 1.6 by 1.6 mm etching window 21*w* in the underside of the substrate. In view of the mechanical strength and the bonding area for the substrate 21B, it is necessary that widths $W_1$ and $W_2$ be at least 1 mm or so. As will be seen from FIG. 6, these frame portions cause a significant loss of the effective area of the optical switch array.

In contrast to the above, the optical switch array of FIG. 7 does not require the above-mentioned frame portions, and permits a substantial reduction in the spacing between adjacent switching elements (for example, 10 μm or less). Accordingly, the optical switch structure of the FIG. 4 embodiment is extremely suitable for miniaturization of the switch array.

As described above, the optical switch of the second embodiment does not require the formation of the frame-like region of the substrate 21A around each switching element as in the case of the optical switch 20 of the first embodiment depicted in FIGS. 2A and 2B. Hence, the matrix-type optical switch array can be made particularly small. Besides, the miniaturization of the device structure further reduces the optical path, providing increased optical performance.

Moreover, this embodiment does not utilize such a substrate bonded structure as in the first embodiment, and hence it solves a problem such as a decrease in the positioning accuracy of the fixed electrode surface by bonding or the influence of stress during bonding. Additionally, since no bonding step is involved, the manufacturing process can be simplified accordingly.

In the manufacturing process of the optical switch of this embodiment described above in respect of FIGS. 5A to 5I, the polysilicon film 2*d* and the silicon substrate 21 are made reverse in conductivity type, a PN junction is formed in the substrate under its surface, and the polysilicon film 2*b* forming the movable electrode 24 and the elastic support portion 23 is connected to the polysilicon film 2*d* through the holes 2*ah* made in the $SiO_2$ protective film 2*a* as shown in FIG. 5C. As depicted in FIGS. 8A through 8H, however, the $SiO_2$ protective film 2*a* may also be left as an insulating layer without making the holes 2*ah* in the step of FIG. 5C. That is, the polysilicon film 2*b* is formed all over the SiO2 protective film 2*a* coated in the step of FIG. 8B and then exactly the same manufacturing steps of FIGS. 8D to 8H as in FIGS. 5E to 5I are carried out, by which the polysilicon film 2*d* and the SiO2 film as the insulating layer 2*a* are left unremoved between the silicon substrate 21 and the stationary portions 22.

THIRD EMBODIMENT

As described previously, the present invention utilizes electrostatic drive for moving up and down by ON-OFF control of the voltage that is applied across the movable electrode and the fixed electrode, but the FIG. 2 embodiment requires a relatively large driving voltage. To reduce the driving voltage, it is necessary to make the elastic support portions 22*a* and 22*b* flexible by increasing their lengths and/or to increase the area of the movable electrode 24. To lengthen the elastic support portions 22 and to increase the area of the movable electrode 24 will inevitably make the optical switch large. This will surely incur undesirable marked upsizing of a large-scale multi-input-multi-output optical switch array (a matrix optical switch) of optical switches arranged in an N-by-M matrix form. A description will be given of an optical switch improved to lower the driving voltage without making the switch large.

In this embodiment, a switch region 40 is chosen to be square which is defined by the envelope of the outer periphery of the region occupied by a movable electrode panel and elastic support portions. A movable electrode in the switch region 40, a mirror standing upright on the movable electrode, and the elastic support portions also in the switch region 40 are disposed above a substrate that forms a fixed electrode opposite the movable electrode panel. The elastic support portions are coupled at one end to marginal edges of the movable electrode and at the other end to the substrate at marginal edges of the switch region 40. The elastic support portions are extended in zigzag between the opposite ends so that they occupy substantially the entire switch region except those occupied by the movable electrode. With such a structure, it is possible to maximize the utilization of the electrode area in the switch region, decreasing the driving voltage accordingly.

Figure 9A:
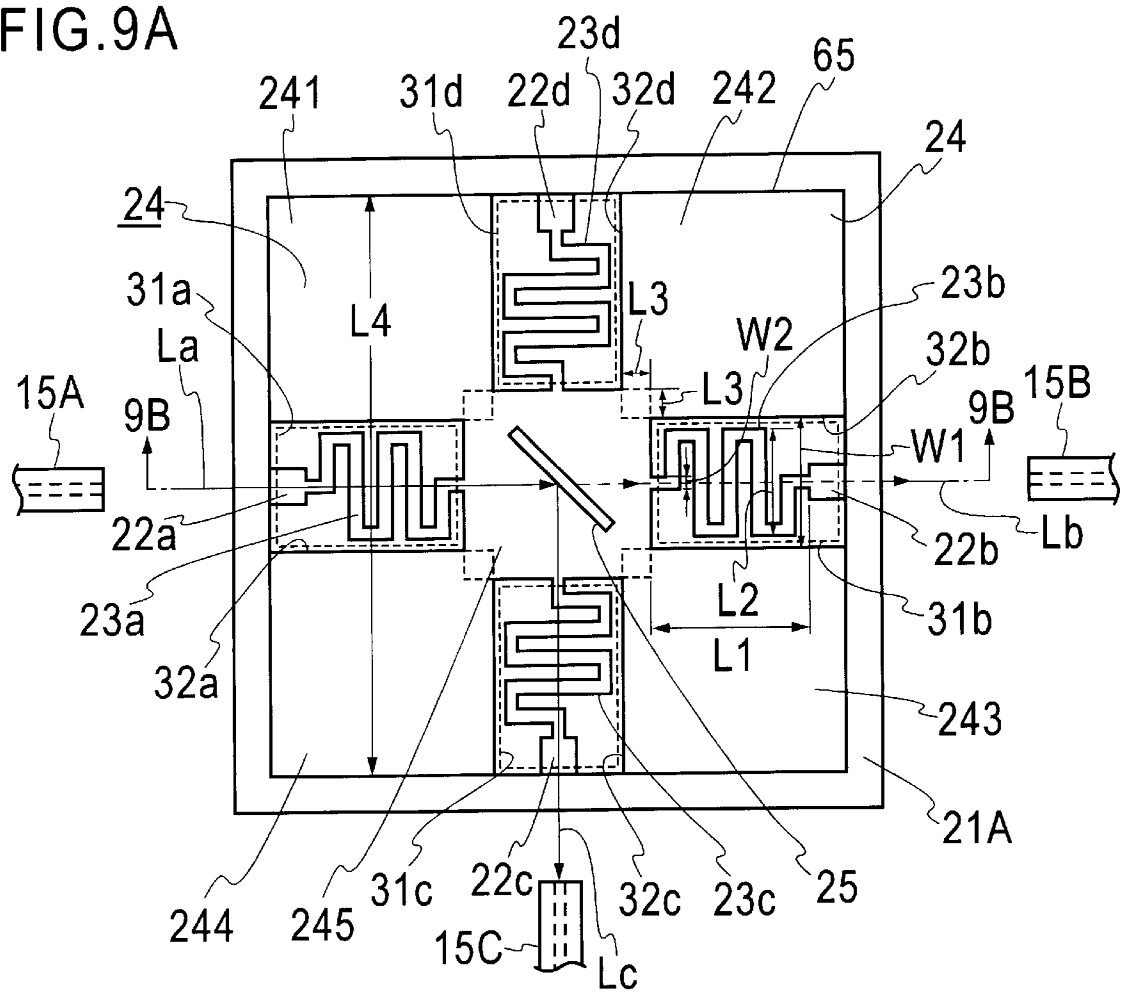
FIG. 9A is a plan view illustrating an optical switch according to a third embodiment of the present invention.
Figure 9B:
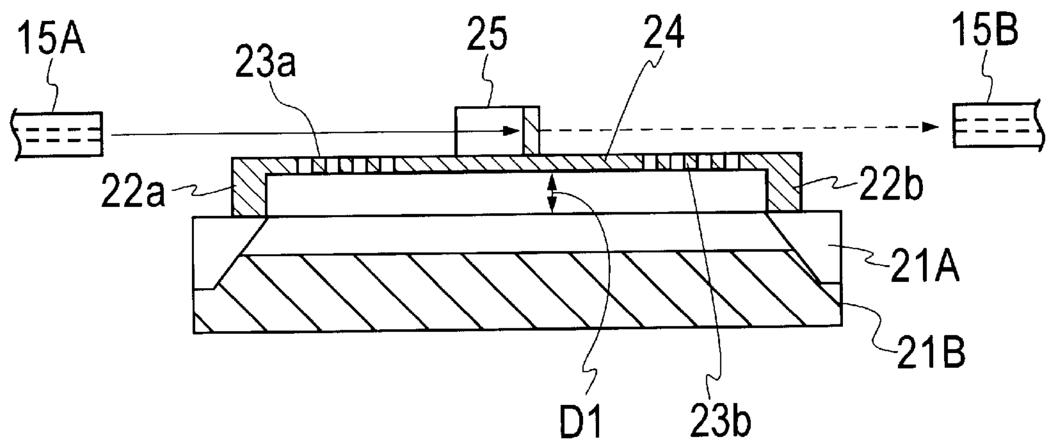
FIG. 9B is a sectional view taken along the line 9B—9B in FIG. 9A.

FIGS. 9A and 9B illustrate the optical switch according to the third embodiment of the present invention. A movable electrode panel 24 is disposed above a square substrate 21A in parallel therewith and supported thereto by elastic support portions 23*a* to 23*d*. With a view to increasing its length, each of the support portions 23*a* to 23*d* is provided in the form of a zigzag beam in substantially the same plane as that of the movable electrode panel 24. The regions 31*a* to 31*d* occupied by the support portions 23*a* to 23*d* and the region by the movable electrode panel 24 (241 to 245) constitute a switch region substantially square in its entirety in this example, that is, a square switch region (which will hereinafter be referred to also as a switch envelope) 40 whose one side is denoted by L4.

In this embodiment, the square movable electrode panel 24 has rectangular cut-out openings 32*a* to 32*d* in the central portions of its four sides and the elastic support portions 23*a* to 23*d* are disposed in the cut-out openings 32*a* to 32*d*. The elastic support portions 23*a* to 23*d* have their outer ends connected to stationary portions 22*a* to 22*d* standing on the substrate 21A at mid-points of the respective sides of the movable electrode panel 24 and have their inner ends connected to the movable electrode panel 24 at mid-points of the inner ends of the cut-out openings 32*a* to 32*d*. The elastic support portions 23*a* to 23*d* are extended in zigzag form between their inner and outer ends across the entire regions of the cut-out openings 23*a* to 23*d*, respectively.

That is, the elastic support portions 23*a* to 23*d* are connected at their inner end to the mid-points of the respective sides of the central square portion 245 of the movable electrode panel 24, extended outwardly in zigzag and connected to the stationary portions 22*a* to 22*d*, respectively. The peripheral square portions 241, 242 and 243 of the movable electrode panel 24 overlap four corners of the central square portion 245 alternately with the elastic support portions 23*a* to 23*d*. The width L2 of the zigzag elastic support portion 23 is chosen to be a little smaller than the width WI of the cut-out opening 32.

The elastic support portions 23*a* to 23*d* are connected to the upper ends of the stationary portions 22*a* to 22*d* on the substrate 21A, by which the movable electrode panel 24 is supported at a distance DI from the substrate 21A. Because of their zigzag beam-like structure, the support portions 23*a*to 23*d* are elastic, and consequently, the movable electrode panel 24 can be displaced vertically to the substrate 21A. The substrate 21A, the movable electrode panel 24, the support portions 23*a* to 23*d* and the stationary portions 22*a* to 22*d* can be formed as a one-piece structure.

The optical switch structure of this embodiment is common to the structure of the FIG. 2 embodiment except in the patterns of the movable electrode panel 24 and the elastic support portions 23*a* to 23*d*. Accordingly, the optical switch of this embodiment can similarly be manufactured using, for example, the same manufacturing steps as those depicted in FIGS. 3A to 3I. That is, the $SiO_2$ protective film 2*a* is formed all over the silicon substrate 21A as depicted in FIG. 3A (Step S1), and the protective film 2*a* is selectively removed by photolithography to form therein the holes 2*ah* at those positions where to provide the stationary portions 22*a* to 22*d* as depicted in FIG. 3B (step S2). Then, the polysilicon layer 2*c* for forming the movable electrode panel 24 is deposited over the entire surface area of the substrate assembly as depicted in FIG. 3C (step S3), and the polysilicon layer 2*b* is patterned by photolithography to form the movable electrode panel 24, the support portions 23*a* to 23*d* and the stationary portions 22*a* to 22*d* as depicted in FIG. 3D (step S4).

Next, the $SiO_2$ protective film 2*c* is formed over the entire surface area of the substrate assembly and all over the underside of the substrate 21A as depicted in FIG. 3E (step S5), then the protective film 2*c* coated all over the underside of the substrate 21A is removed leaving only at its marginal portion as depicted in FIG. 3F, and the substrate 21A is etched away by the KOH solution with the remaining protective film 2*c* as a mask (step S6), by which the large opening 21*a* is formed in the portion of the substrate 21A corresponding to the movable electrode panel 24, leaving the substrate 21A only at its marginal portion (Step S7). After this, the $SiO_2$ protective films 2*a*, 2*b* and 2*c* are removed by chemical etching to obtain a structure that supports the movable electrode panel 24 above the frame-shaped substrate 21A as depicted in FIG. 3H (step S8). Next, as shown in FIG. 3I, the conductive silicon substrate 21B is fitted into the opening 21B of the substrate 21A from the side opposite to the movable electrode panel 24 and bonded to the substrate 21A.

The mirror 25 is placed on the movable electrode panel 24 as shown in FIGS. 9A and 9B by the same method as described previously in respect of the first embodiment. The mirror 25 is disposed, for instance, at 45 degrees to the direction of a line joining the resilient support portions 23*a* and 23*b*. The mirror 25 may be formed integrally with the movable electrode panel 24, or separately formed and fixedly secured to the movable electrode panel 24. The movable electrode panel 24 and the elastic support portions 23*a* to 23*d* are formed, for example, 2 to 5 $\mu$m thick.

While this embodiment has been described to bond the conductive substrate 21B to the frame-shaped substrate 21A as is the case with the first embodiment, it is also possible to form, as the fixed electrode, the low-floor portion 21L in the conductive substrate 21 as in the second embodiment depicted in FIGS. 4A and 4B.

With the optical switch of this embodiment, too, the light beam La from the incoming-side optical fiber 15A disposed at the left-hand side in FIG. 9A is incident on and reflected by the mirror 25 and then launched into the outgoing-side optical fiber 15C. When a voltage is applied across the movable electrode panel 24 and the substrate 21B to generate therebetween electrostatic force, the movable electrode panel 24 is displaced toward the substrate 21B, allowing the light beam La from the optical fiber 15A to pass over the mirror 25 for incidence on the other outgoing-side optical fiber 15B disposed at the right-hand side in FIG. 9A. Thus, the light beam La from the optical fiber 15A can selectively be switched between the optical fibers 15B and 15C by selective voltage application across the movable electrode panel 24 and the substrate 21B.

The optical switch of this embodiment has such dimensions as follows: 1000 $\mu$m for the length L4 of one side of the movable panel 24; 300 $\mu$m for the length L1 of each of the elastic support portions 23*a* to 23*d*; 200 $\mu$m for the width L2 of each zigzag support portion; 10 $\mu$m for the width W2 of the zigzag beam; 50 by 50 $\mu$m for a square cross-section of each of the stationary portions 22*a* to 22*d*; and 30 $\mu$m for the length L3 of each portion common to the central square portion 32*a* and each of the peripheral square portions 241 to 244.

Since the square movable electrode panel 24 is partly cut out to form therein openings and the elastic support portions 23*a* to 23*d* are disposed in the cut-out openings 32*a* to 32*d*, the area of the square movable electrode panel 24 can be made large. And since the elastic support portions 23*a* to 23*d* are each provided in the form of a zigzag beam, the beam is long relative to the length L1 of the support potion 23, making it possible to obtain a required amount of displacement with a small amount of electrostatic force. In the first embodiment shown in FIGS. 2A and 2B, the movable electrode panel 24 is limited only to the central square portion 245, but in this embodiment the elastic support portions 23*a* to 23*d* and the peripheral square portions 241 5o 244 are alternately disposed about the central square portion 245 and connected thereto—this provides a markedly increased area for the movable electrode panel 24. In the above examples of various numerical values, the area of the central square portion 245 is 300 by 300 $\mu m^2$, and hence it can be said that the area of the movable electrode panel 24 is larger than in the FIG. 2 embodiment by the sum of the areas of the four peripheral square portions 241 to 244, that is, by 4×380×380 μm. Conversely, the cut-out openings are provided in the movable electrode panel 24 and the elastic support portions 23*a* to 23*d* are disposed in the cut-out openings, by which the entire structure is significantly reduced in size. A description will be given below of some examples of configurations of the movable electrode, each elastic support portion and each stationary portion.

Figure 10:
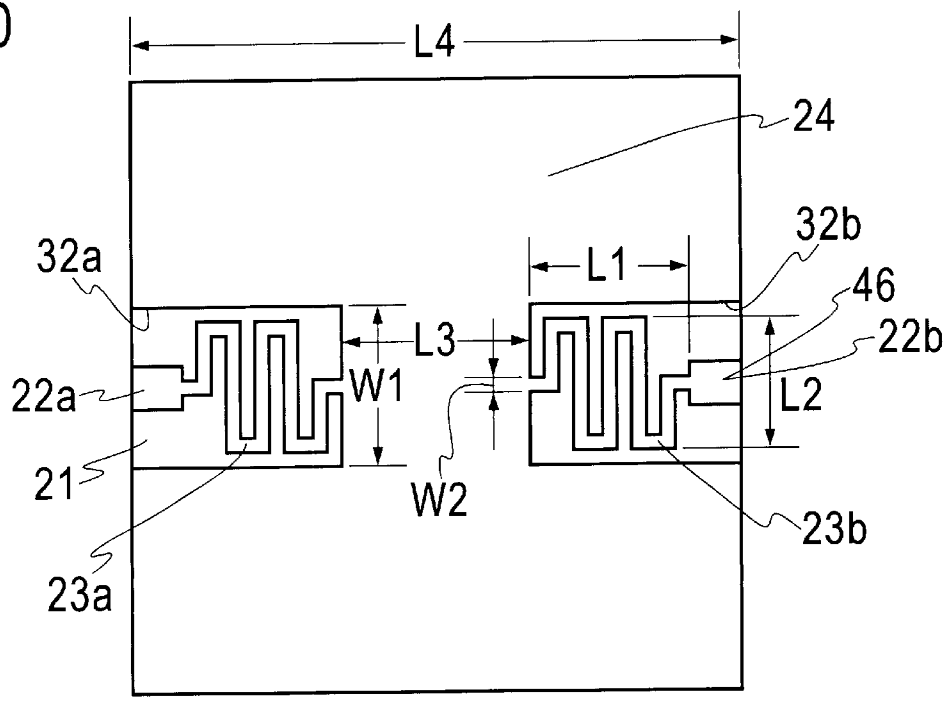
FIG. 10 is a plan view depicting a movable electrode-elastic support pattern.

While in the FIG. 9 embodiment the movable electrode panel 24 is supported at four points by the elastic support portions 23*a* to 23*d* at 45-degree intervals around the center of the panel 24, it may also be supported at two points by two elastic support portions 23*a* and 23*b* at 180-degree intervals as depicted in FIG. 10. In this case, the optical switch has such dimensions as listed below. The movable electrode pane 24 is a square panel (which have two rectangular cut-out openings 32*a* and 32*b*) measuring 1000 by 1000 μm; the length L1 of each of the elastic support portions 23*a* and 23*b* is 300 μm; the width L2 of each zigzag support portion is 200 μm; the beam width W2 is 10 μm; the stationary portions 22*a* and 22*b* each have a cross-section measuring 5 by 50 μm; the distance L3 between the inner ends of the cut-out openings 32*a* and 32*b* is 300 μm; and the width W1 of each of the cut-out openings 32*a* and 32*b* is 240 μm. Incidentally, in the FIG. 10 embodiment the substrate 21 has about the same configuration as the square configuration of the movable electrode panel 24. That is, the size of this optical switch in the horizontal plane is the same as the size of the movable electrode panel 24, and the outside shape of the optical switch is 100 by 100 μm in the afore-mentioned examples of various numerical values.

Figure 11:
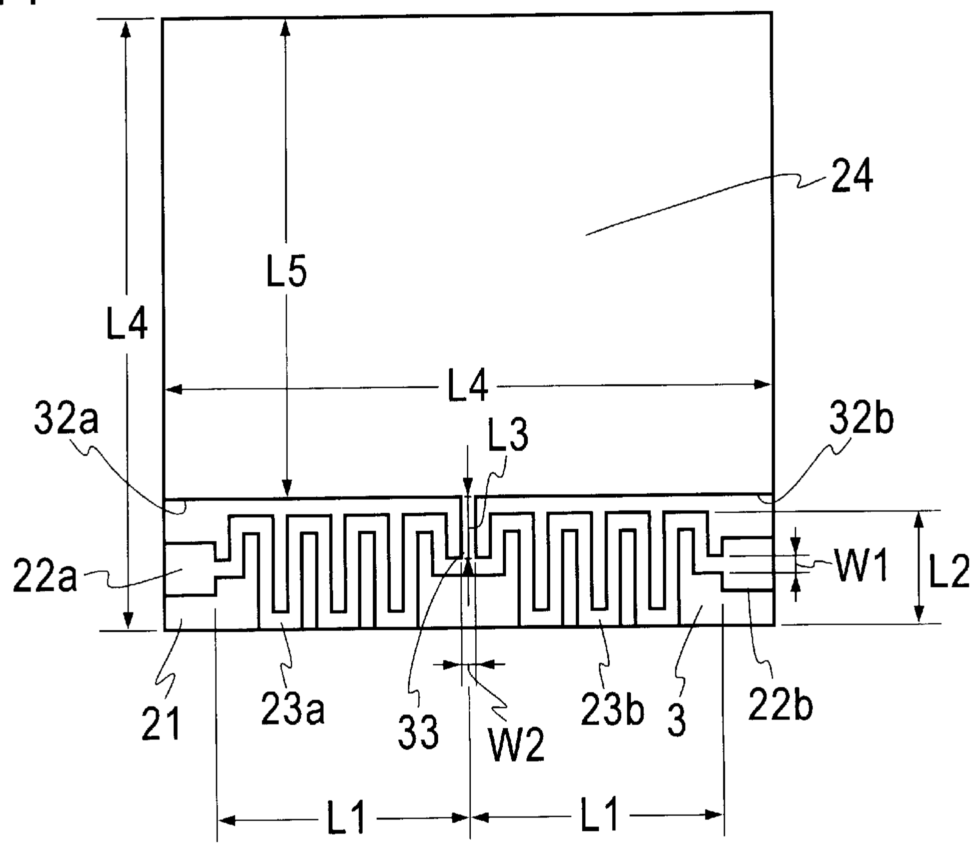
FIG. 11 is a plan view depicting another movable electrode-elastic support pattern.

The movable electrode panel 24 may also be supported at one point as depicted in FIG. 11. That is, two elastic support portions 23*a* and 23*b* are disposed along one side of the movable electrode panel 24, and the elastic support portions 23*a* and 23*b* have their far ends connected to the substrate 21 through the stationary portions 22*a* and 22*b*, respectively, and have their near ends interconnected, the interconnecting point being connected to the mid-point of the adjoining side of the movable electrode panel 24 through a coupling portion 33. In other words, the movable electrode panel 24 is supported at one side by the elastic support portions 23*a* and 23*b* through the coupling portion 33. It can be said that the elastic support portions 23*a* and 23*b* are provided in the cut-out openings 32*a* and 32*b* formed by cutting out part of the square movable electrode panel 24 along one side thereof.

An example of numerical values in this case is as follows: 1000 μm for the longer side L4 of the movable electrode panel 24; 780 μm for its shorter side L5; 450 μm for the length L1 of each of the elastic support portions 23*a* and 23*b*; 200 μm for the width L2 of each zigzag support portion; 10 μm for the beamwidth W1; 115 μm for the length L3 of the coupling portion 33; 10 μm for its width W2; and 50 by 50 μm for the cross-section of each of the stationary portions 22*a* and 22*b*. The outer dimension of the optical switch is 1000 by 1000 μm.

Figure 12:
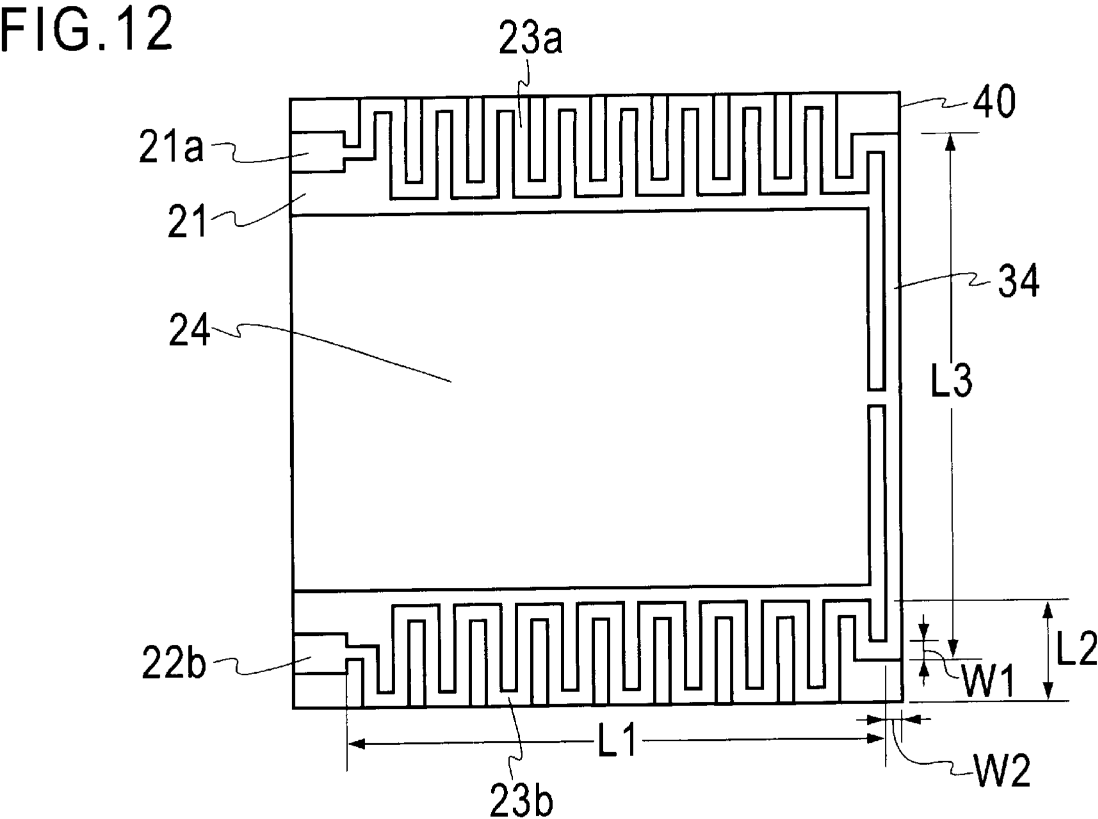
FIG. 12 is a plan view depicting another movable electrode-elastic support pattern.

The movable electrode panel 24, though supported at one point, may also be formed as shown in FIG. 12. That is, the elastic support portions 23*a* and 23*b* are disposed along two longer sides of a rectangular movable electrode panel 24, respectively; the elastic support portions 23*a* and 23*b* are connected at one end of the same side to the substrate 21 through the stationary portions 22*a* and 22*b*, respectively, and connected at the other end to opposite ends of a coupling beam 34, which is connected at its mid-point to that of one shorter side of the movable electrode panel 24. Thus, the movable electrode panel 24 is surrounded, except one shorter side, by the elastic support portions 23*a* and 23*b* and the coupling beam 34. It can be said that after two opposed marginal portions of a square movable electrode panel 24 are cut off, the support portions 23*a* and 23*b* are disposed there instead. With this structure, the lengths of the elastic support portions 23*a* and 23*b* can be increased.

Various dimensions in this instance are such, for example, as follows: 940 μm for the length L1 of each of the elastic support portions 23*a* and 23*b*, 200 μm for the length L2 of each zigzag support portion, 10 μm for the beam width, 810 μm for the length L3 of the coupling beam 34, 10 μm for its width W2, 50 by 50 μm for the cross-section of each of the stationary portions 22*a* and 22*b*; 970 μm for the longer side L4 of the movable electrode panel 24, and 560 μm for its shorter side L5. The outer dimension of the optical switch is 1000 by 1000 μm.

Figure 13:
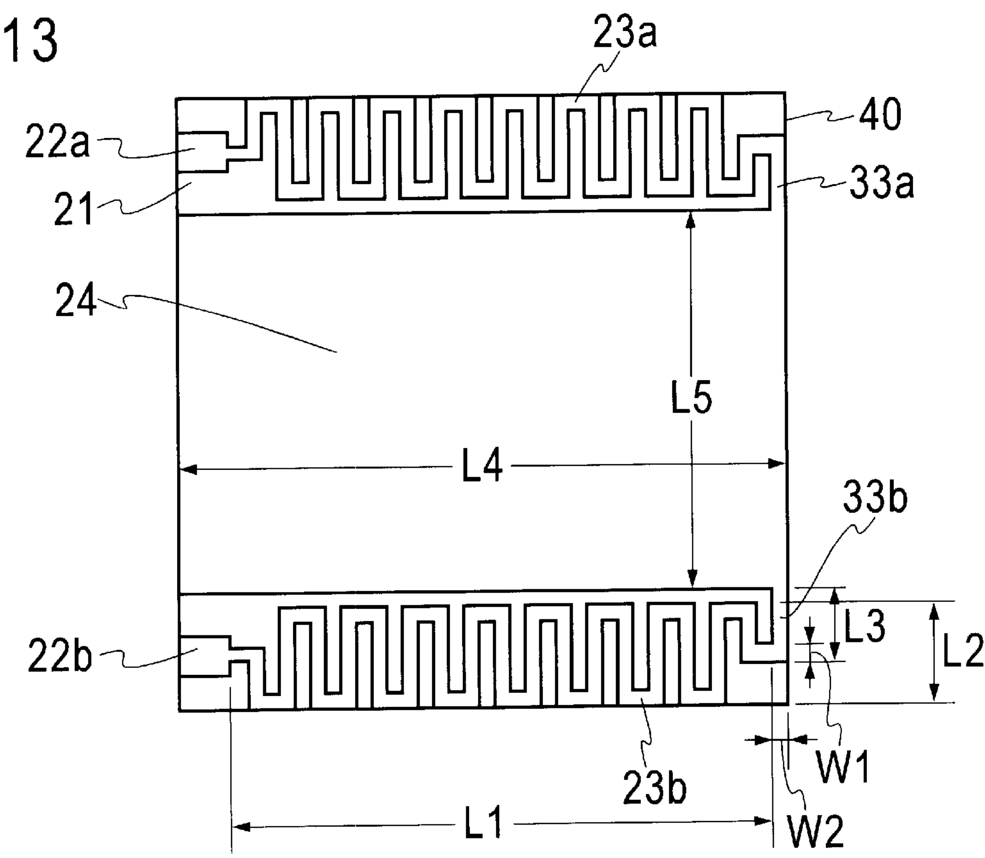
FIG. 13 is a plan view depicting another movable electrode-elastic support pattern.

As depicted in FIG. 13, the coupling beam 34 may be omitted, in which case the elastic support portions 23*a* and 23*b* are coupled to both ends of the shorter side of the movable electrode panel 24 through coupling portions 33*a* and 33*b*, respectively. Various dimensions in this case are such, for example, as follows: 940 μm for the length L1 of each of the resilient support portions 23*a* and 23*b*; 200 μm for the width L2 of each zigzag support portion; 10 μm for the beam width; 125 μm for the length L3 of each of the coupling portions 33*a* and 33*b*; 10 μm for their widths W2; 50 by 50 μm for the cross-section of each of the stationary portions 22*a* and 22*b*; 1000 μm for the longer length L4 of the movable electrode panel 24; and 560 μm for its shorter side L5. The outer dimension of the optical switch is 1000 by 1000 μm.

Figure 14:
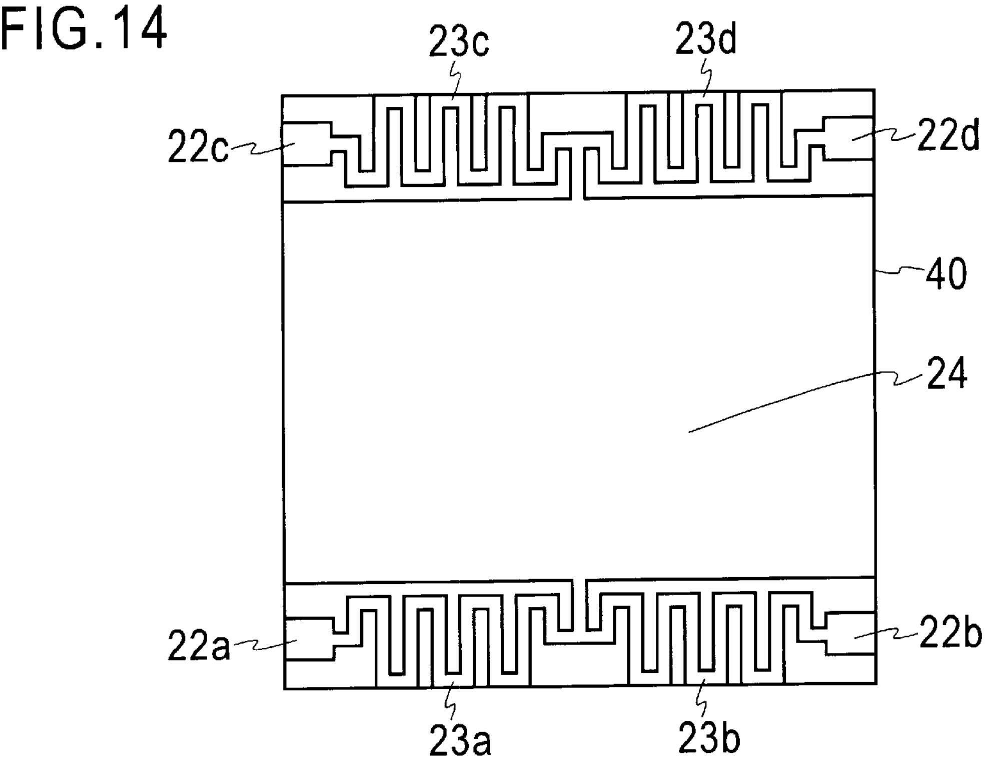
FIG. 14 is a plan view depicting another movable electrode-elastic support pattern.

FIG. 14 illustrates another modified form of the FIG. 11, in which the elastic support portions 23*c*, 23*d* are provided in the movable electrode panel 24 on the side away from the resilient support portions 23*a*, 23*b* are coupled to each other and the coupling portion is connected to the movable electrode panel 24. Thus, the movable electrode panel 24 is supported at two points.

Figure 15:
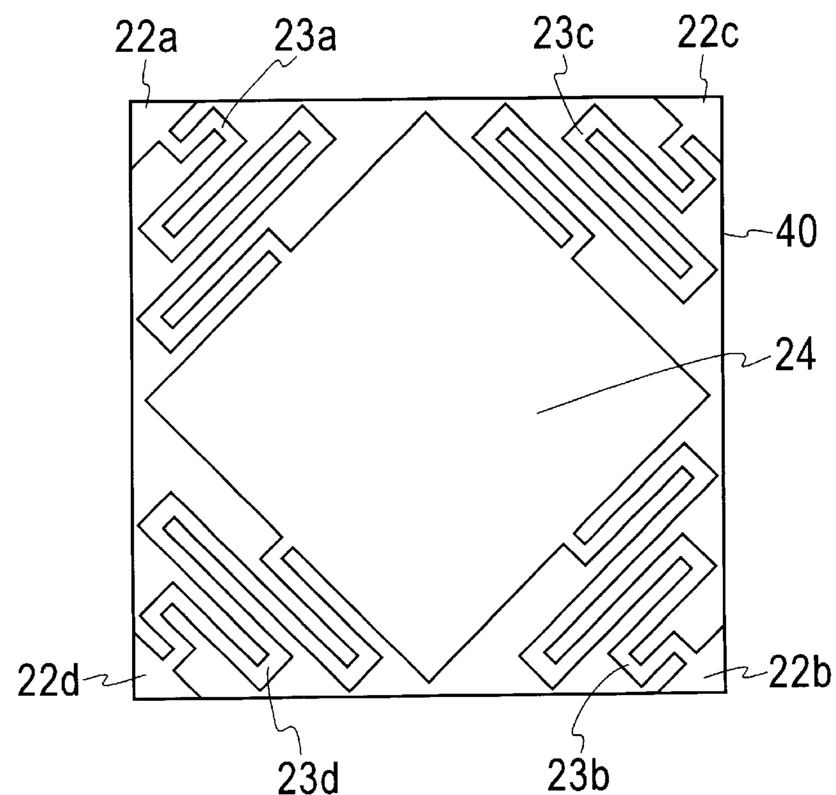
FIG. 15 is a plan view depicting another movable electrode-elastic support pattern.

FIG. 15 illustrates another embodiment of the present invention, in which a square movable electrode panel 24 is disposed at an angle of 45 degrees to a square optical-switch outside shape or envelope 40 with its vertexes at the mid-points of respective sides of the envelope 40 and the support portions 23*a* to 23*d* are connected at one end to the mid-points of respective sides of the movable electrode panel 24 and at the other end to the stationary portions 22*a* to 22*d* formed upright on the substrate 21 at four corners of the optical switch envelope 40. The width of zigzag configuration of each of the support portions 23*a* to 23*d* increases toward the movable electrode panel 24 but decreases toward the stationary portion, thus making effective use of empty space between the movable electrode panel 24 and the optical switch envelope 40. In this instance, too, it can be said that four corner portions of an electrode of the same size as the optical switch envelope 40 are cut away to form the movable electrode panel 24 centrally thereof and the support portions 23*a* to 23*d* are provided in the cut-out openings.

Figure 16:
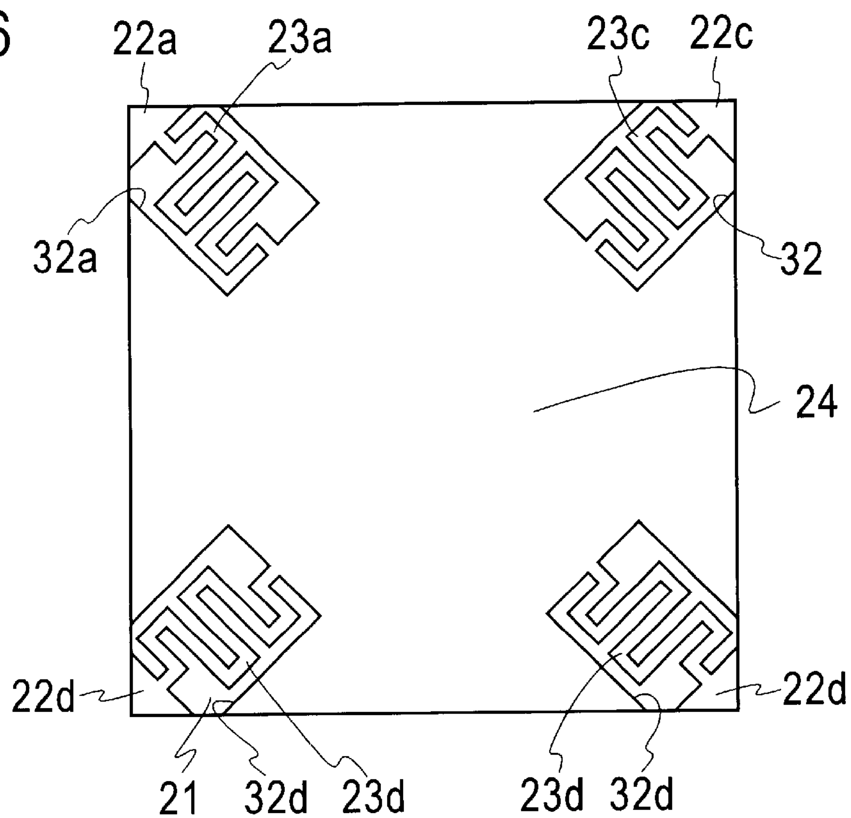
FIG. 16 is a plan view depicting another movable electrode-elastic support pattern.

It is also possible to employ such a structure as depicted in FIG. 16 in which the movable electrode panel 24 has about the same outside shape as that of the optical switch envelope 40 and has rectangular cut-out openings 32*a* to 32*d* extending from the four corners of the electrode panel 24 toward the center thereof, and the support portions 23*a* and 23*d* are disposed in the cut-out openings 32*a* to 32*d*, respectively, and have their inner ends connected to the movable electrode panel 24 and have their outer ends connected to the substrate 21 through the stationary portions 22*a* to 22*d*.

Figure 17:
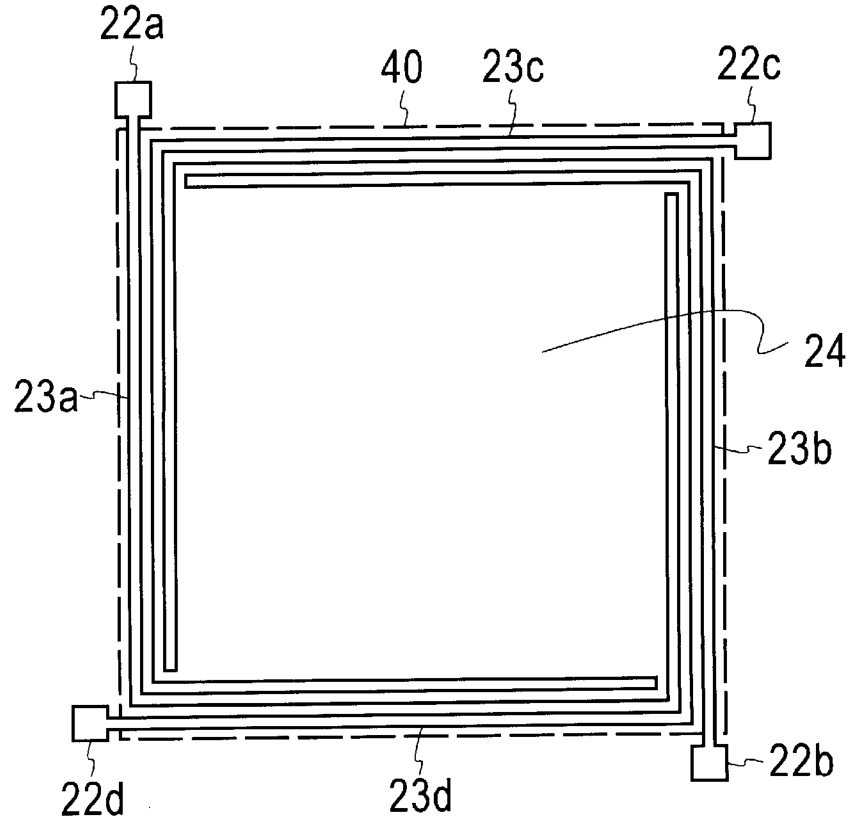
FIG. 17 is a plan view depicting still another movable electrode-elastic support pattern.

In an embodiment depicted in FIG. 17, a square movable electrode panel 24 is disposed in a square switch region centrally thereof and the elastic electrode panel 24 are extended in parallel to its sides in the same direction of rotation and turned or bent 90 degrees in the same direction at the next corners and then each extended outside the inner support portion parallel to the adjoining side and projected out of the switch region 40, the projected ends being fixed to the stationary portions 22*a* through 22*d*. With this structure, the elastic support portions 23*a* to 23*d* each have only one bend and form a long support portion. In the case of the same length, the elastic constant increases with an increase in the number of bends. Accordingly, the structure of this embodiment provides support portions of low elastic constant and hence permits driving the optical switch at low voltage.

While the embodiments described above have been described to use the conductive polysilicon film to form the movable electrode and elastic support portions in one piece, other conductive films as of metal may also be used. Furthermore, the above embodiment have been described to use the micro mirror 25 for switching the optical path of the incoming light beam, a micro prism may also be used as such an optical path switching element in place of the micro mirror.

Figure 18:
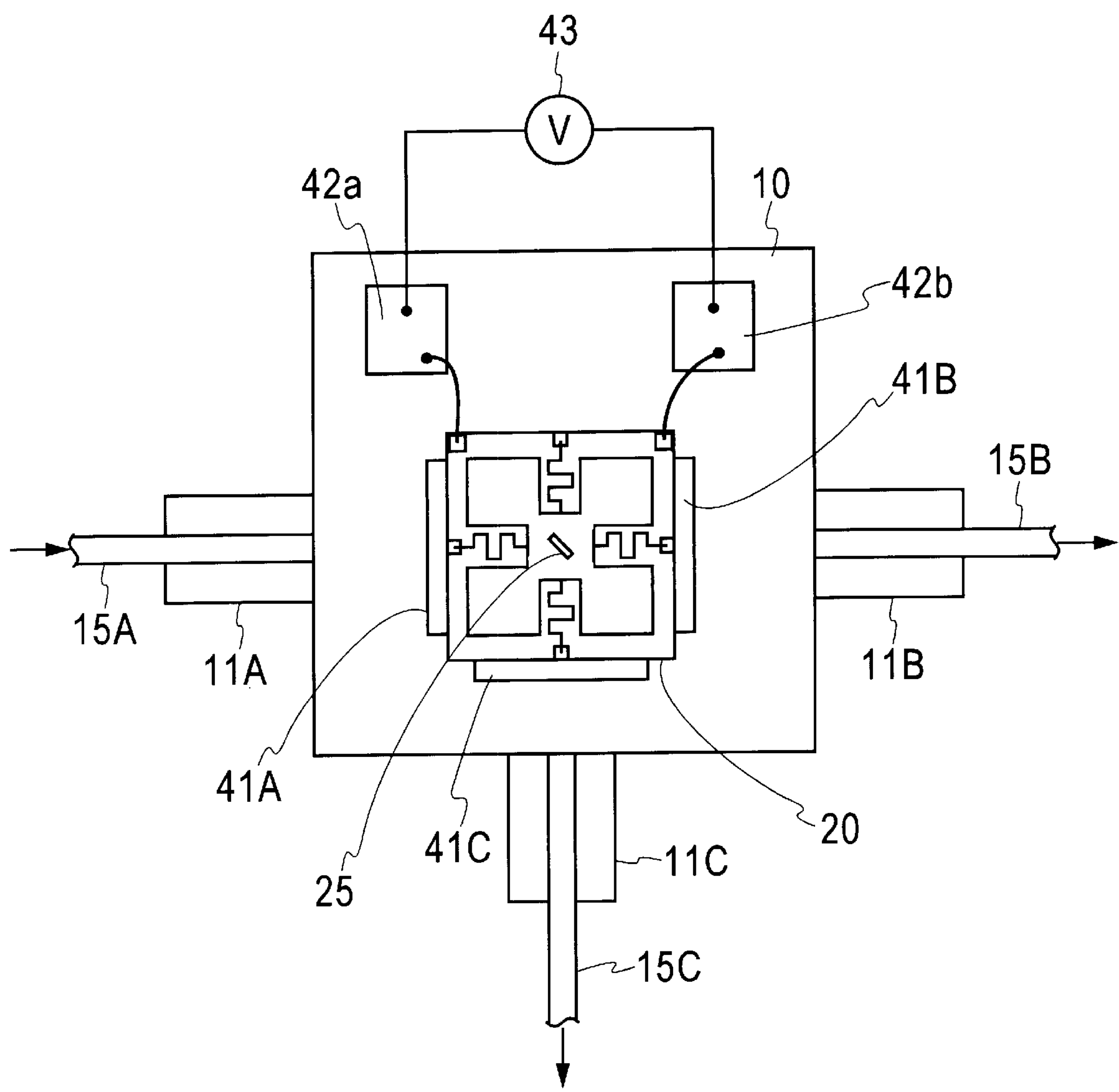
FIG. 18 is a plan view showing an optical switch module using the optical switch of the present invention.

FIG. 18 schematically illustrates an example of an optical switch module actually formed using the optical switch according to the present invention. The optical switch 20 employs, in the FIG. 4 embodiment, the structures of the movable conductive panel 24 (241 to 245), the elastic support portions 23*a* to 23*d* and the stationary portions 22*a* and 22*d* depicted in FIG. 9 (none of these reference numerals being shown for simplicity sake). The optical switch 20 is mounted on a rectangular glass substrate 10.

Attached to three sides of the glass substrate 10 are V-groove blocks 11A, 11B and 11C, and the incoming-side optical fiber 15A and two outgoing-side optical fibers 15B and 15C are received in the V-grooves with their optical axes kept in alignment with the micro mirror 25 of the optical switch 20. The movable electrode panel 24 and the fixed electrode are connected by wire bonding to terminal electrodes 42*a* and 42*b* on the glass substrate 10, and a driving voltage is applied across the terminal electrodes 42*a* and 42*b* from a driving voltage source 43.

On the optical switch 20 there are placed plane micro lenses (PMLs) 41A, 41B and 41C along its three marginal edges. These PMLs 41A, 41B and 41C are high enough to stay in the optical path even when the movable electrode panel 24 is displaced to a maximum. The incident light from the optical fiber 15A is reduced in diameter by the PML 41A down to a minimum at the position of the mirror 25 and then spreads again. When the mirror 25 is displaced by the application of the driving voltage, the light beam from the optical fiber 15A passes through the PML 41A and is reduced again in diameter by the PML 41B, thereafter being launched into the optical fiber 15B. With no driving voltage applied, the light beam reflected by the mirror 25 is reduced again in diameter by the PML 41C and then launched into the optical fiber 15C. In our experiments, the light beam emitted from the optical fiber 15A spread thick about 140 $\mu$m in diameter until it impinged on the PML 41A but reduced down to 33 $\mu$m until it reached the mirror 25 from the PML 41A. The mirror 25 was 45 $\mu$m in height.

Figure 19:
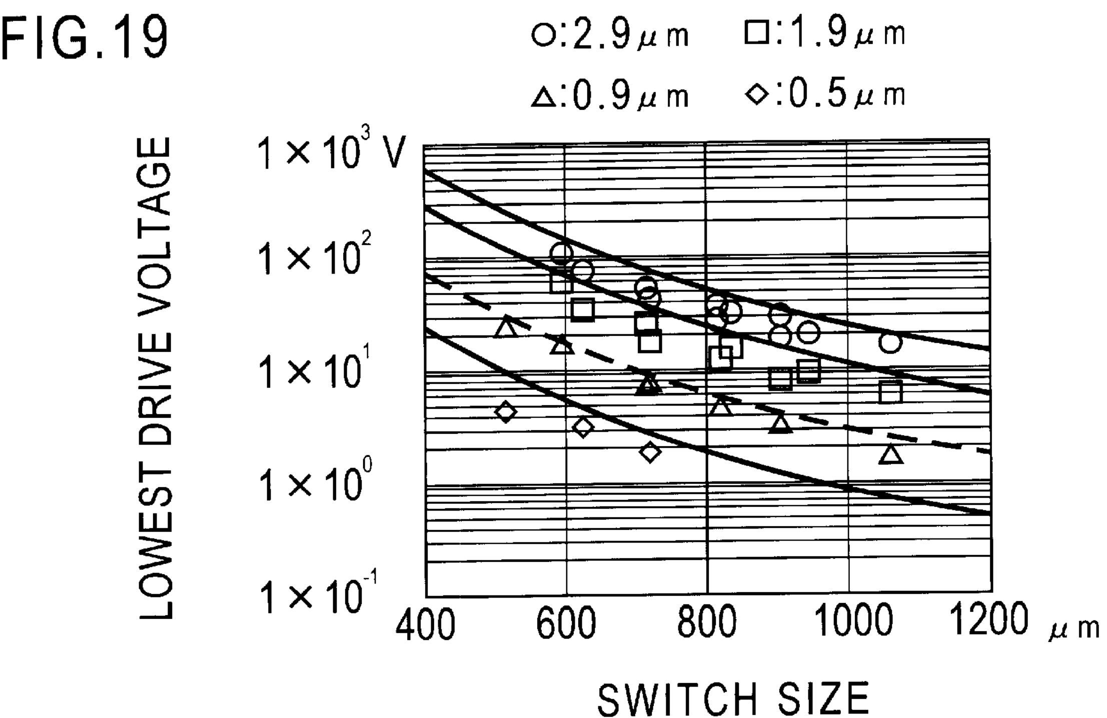
FIG. 19 is a graph showing minimum driving voltages measured with respect to the switch size, using the thickness of the elastic support in the FIG. 18 structure as a parameter.

FIG. 19 is a graph showing measured values of the minimum driving voltage in the optical switch module of FIG. 18 with respect to variations in the size of the movable electrode (the length of its one side) using the thickness of the elastic support portion 23 as a parameter. The wavelength of light used is 1.55 $\mu$m. The solid lines indicate calculated values by simulation. The minimum driving voltage decreases with a decrease in the thickness of the elastic support portion or an increase in the size of the movable electrode. The measured results shown in FIG. 19 suggest that an optical switch of a driving voltage below 5V could be obtained, and indicate that an ultraminiature optical switch with a 600- $\mu$m movable electrode size could be realized if the thickness of the elastic support portion would be 0.5 $\mu$m, for instance.

Figure 20:
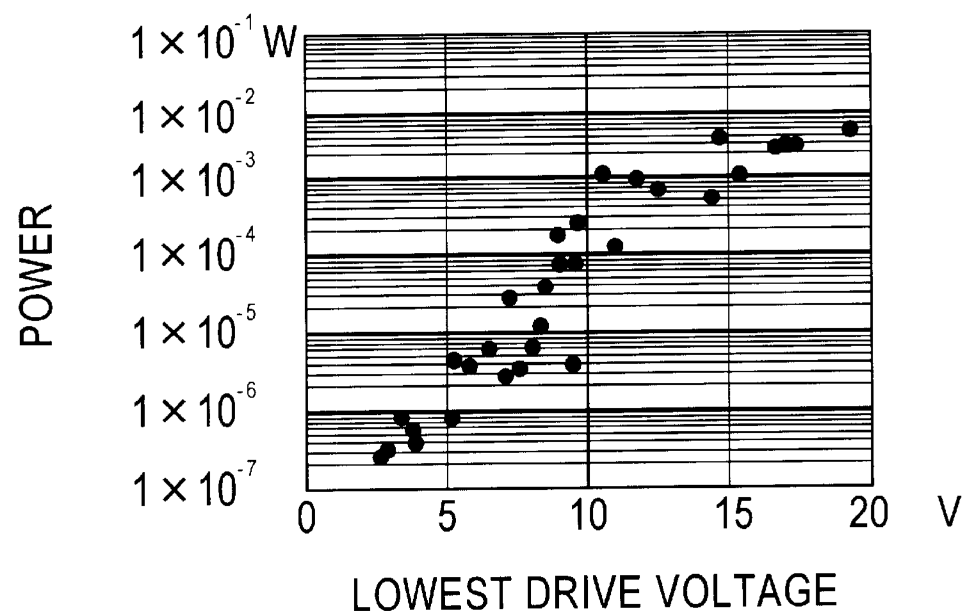
FIG. 20 is a graph showing the relationship between the minimum driving voltage and power consumption measured for various switch sizes.

FIG. 20 is a graph showing the relationships between the minimum driving voltages of optical switches having elastic support portions of various thicknesses and movable electrode sizes and their power consumption. As will be seen from the graph, it is possible to produce a power-saving optical switch whose driving voltage is lower than 5 V and power consumption is less than several $\mu$W. Accordingly, the optical switch of the present invention is suitable for use in optical networks. In our experiments the optical switch was driven by ON-OFF control of DC voltage, but electrostatic attractive force between electrodes can similarly be obtained even with AC driving voltage.

EFFECT OF THE INVENTION

According to a first aspect of the present invention, since electrostatic drive is used to displace the micro mirror, the optical switch can be made far smaller than in the past and hence is suitable for use in optical networks.

According to a second aspect of the present invention, the surface region of the conductive substrate opposite the movable electrode panel and the elastic support portion is etched away to form the low-floor portion that is used as the fixed electrode. This eliminates the necessity for making an opening in the substrate as in the prior art and hence permits fabrication of a matrix optical switch with no wasted space.

According to a third aspect of the present invention, since the region where the movable electrode panel and the support portions is square, the optical switch can be miniaturized and the area of the movable electrode panel can be made large—this allows effective use of the area of the outside shape of the optical switch structure and permits low-voltage driving of the switch.

It will be apparent that many modifications and variations may be effected without departing from the scope of the novel concepts of the present invention.

What is claimed is:

1. An optical switch comprising:

substrate means;

fixed electrode means fixedly secured to said substrate means with the surface of said fixed electrode means held lower than and in parallel to the surface of said substrate means;

movable electrode means disposed opposite to said fixed electrode means in spaced relation thereto;

elastic support means for coupling said movable electrode means and said substrate means and for elastically supporting said movable electrode means so that said movable electrode means can be displaced vertically to said fixed electrode means; and optical path switching means provided on the surface of said movable electrode means opposite said fixed electrode means and having a light receiving surface vertical to said surface of said movable electrode means;

wherein, by ON-OFF control of voltage application across said movable electrode means and said fixed electrode means, said movable electrode means is displaced toward said fixed electrode means and returned to its normal position to selectively switch the optical path of an incident light means by said optical path switching means.

2. The optical switch of claim 1, wherein said elastic support means has a plurality of elastic support portions for coupling a plurality of different marginal portions of said movable electrode means to said substrate means.

3. The optical switch of claim 1, wherein said elastic support means has fixing means of increased thickness coupled to said substrate means, for supporting said elastic support means and said movable electrode means above the surface of said substrate means.

4. The optical switch of claim 1, wherein: said substrate means has an opening facing a region containing at least said movable electrode means and said elastic support means; and said fixed electrode means includes a conductive substrate secured to said substrate means from the side opposite said movable electrode means in a manner to fill said opening, said conductive substrate having, as a fixed electrode, its surface opposed to said movable electrode means in spaced relationship thereto.

5. The optical switch of claim 1, 2, 3, or 4, wherein said substrate means is a silicon substrate.

6. The optical switch of claim 5, wherein said movable electrode means and said elastic support means are integrally formed of the same material.

7. The optical switch of claim 6, wherein said movable electrode means and said elastic support means are integrally formed by a polysilicon film.

8. The optical switch of claim 1, wherein said substrate means is a conductive substrate, said conductive substrate having, as said fixed electrode means, a low-floor portion made lower than the substrate surface over an area facing said movable electrode means and said elastic support means.

9. The optical switch of claim 8, wherein said elastic support means has fixing means of increased thickness coupled to said substrate means, for supporting said elastic support means and said movable electrode means above the surface of said substrate means.

10. The optical switch of claim 9, wherein said movable electrode means and said elastic support means are integrally formed of the same material.

11. The optical switch of claim 10, wherein: said conductive substrate is a silicon substrate of either one of P and N conductivity types; said movable electrode means and said elastic support means are integrally formed by a polysilicon film of the other conductivity type; and a PN junction is formed in said silicon substrate under the surface thereof at a portion coupled to said elastic support means.

12. The optical switch of claim 8, wherein said elastic support means includes an insulating layer coupled to said substrate means, for electrically insulating said substrate means and said elastic support means.

13. The optical switch of claim 9 or 11, wherein said movable electrode means has a plurality of through holes.

14. The optical switch of claim 1, 4, or 8, wherein said elastic support means has two elastic support portions extending in opposite directions from two opposite sides of said movable electrode means.

15. The optical switch of claim 14, wherein said two elastic support portions are each in the shape of a rectangular frame and coupled substantially at the centers of its two opposed sides to said movable electrode means and said substrate means, respectively.

16. The optical switch of claim 1, 4, or 8, wherein a substantially rectangular switch region is defined by the envelope of the periphery of a region occupied by said movable electrode means and said elastic support means.

17. The optical switch of claim 16, wherein: said movable electrode means has a substantially rectangular central electrode portion disposed inside said switch region concentrically therewith with its respective sides extending in parallel with those of said switch region, and four substantially rectangular peripheral electrode portions each having a first corner portion overlapping one of four corner portions of said central electrode portion and a second corner portion diagonally opposite said first corner portion; and said elastic support means has four elastic support portions each extending in zigzag form across the entire area of a rectangular region defined between said peripheral electrode portions adjacent thereto and coupled at one end to said central electrode portion and at the other end to said substrate means at a marginal edge of said switch region.

18. The optical switch of claim 16, wherein said elastic support means includes two elastic support portions each extending in zigzag form across the entire area of one of two substantially rectangular regions of the same size extended toward each other from two opposite sides of said switch region and coupled at one end to said movable electrode means and at the other end to said substrate means.

19. The optical switch of claim 18, wherein: said movable electrode means is a rectangle occupying one of two regions divided from said switch region along a straight line parallel to one side thereof; said two rectangular regions are defined to occupy the other region and extend along the same side of said rectangular region; and said one end of each of said two elastic support portions is coupled to said movable electrode means at the same point.

20. The optical switch of claim 16, wherein: said movable electrode means is a rectangle occupying a central one of three regions divided from said switch region along two straight lines parallel to one side thereof; and said elastic support means is extended in zigzag form across the entire area of said rectangular region at either side of said movable electrode means.

21. The optical switch of claim 20, wherein one end of said elastic support means is coupled to said substrate means on one of shorter sides of said rectangular region and the other end of said each elastic support portion is extended from the other shorter side along a side at right angles to said one side of said switch region and coupled to said movable electrode means on its shorter side.

22. The optical switch of claim 20, wherein said extended elastic support means are coupled at one end to said substrate means at one of shorter sides of said rectangle and at the other end to two corner portions of said movable electrode means on the other shorter side.

23. The optical switch of claim 20, wherein said extended elastic support means is coupled at both ends to said substrate means on both shorter sides of said rectangle and coupled to said movable electrode means on the longer side of said rectangle substantially at the center thereof.

24. The optical switch of claim 16, wherein: said switch region is substantially square; said movable electrode means has substantially a square form with its vertexes at the centers of respective sides of said switch region; said elastic support means is coupled at one end to each side of said movable electrode means, extended in zigzag form across the entire area of each of four triangular regions outside said movable electrode means in said switch region and coupled to said substrate means at that one of four corner portions of said switch region which is opposite said each side.

25. The optical switch of claim 16, wherein: said switch region is substantially square; said elastic support means is coupled to said substrate means at each corner portion of said switch region, extended in zigzag form across the entire area of substantially a rectangular support region extended from said each corner portion of said switch region toward the center thereof and coupled to said movable electrode means on the side of said support region away from said each corner portion.

26. The optical switch of claim 16, wherein: said movable electrode means has a rectangular form having sides parallel to respective sides of said switch means; and said elastic support means has four beam-like elastic support portions coupled at one end to respective corner portions of said movable electrode means, extended in the same direction of rotation at least one of respective sides of said movable electrode means in parallel thereto and coupled at the other end to said substrate means.

27. A method for making an optical switch in which an optical path switching element mounted on a movable electrode is displaced to switch the optical path of an incident light beam, said method comprising the steps of:

(a) forming on a silicon substrate a pattern containing a movable electrode portion and an elastic support portion coupled thereto by a conductive silicon film by the steps of:

(a-1) forming an $SiO_2$ film over the entire surface area of said silicon substrate and making a hole in said $SiO_2$ film at the position where to couple said elastic support portion to said silicon substrate;

(a-2) forming said polysilicon film all over said $SiO_2$ film; and (a-3) patterning said polysilicon film by etching to form said pattern containing said movable electrode portion and said elastic support portion;

(b) making an opening by etching away that region of said silicon substrate which is opposite to at least said movable electrode portion and said elastic support portion;

(c) attaching a conductive substrate to the underside of said silicon substrate so that one surface region of said conductive substrate serves as a fixed electrode opposite but spaced apart from at least said movable electrode portion in said opening; and (d) forming said optical path switching element on said movable electrode portion.

28. The method of claim 27, wherein said step (b) comprises the steps of:

(b-1) forming an $SiO_2$ protective film all over the surface and underside of said silicon substrate;

(b-2) forming said opening in said silicon substrate by etching away said $SiO_2$ protective film on that region of the underside of said silicon substrate which is opposite said movable electrode portion and said support portion; and (b-3) removing the entire remaining protective film.

29. The method of claim 27, or 28, wherein said optical switching element is a micro mirror, and said step (d) comprises the steps of:

(d-1) forming a plating seed metal land on said movable electrode portion at the position where to form said micro mirror;

(d-2) forming a resist layer over the entire surface area of said silicon substrate and exposing part of said seed metal land by making a hole of the same shape as said micro mirror in said resist layer at the position where to form said micro mirror;

(d-3) filling said hole with metal for said micro mirror by plating; and (d-4) removing said resist layer.

30. A method for making an optical switch in which an optical path switching element mounted on a movable electrode is displaced to switch the optical path of an incident light beam, said method comprising the steps of:

(a) forming a first polysilicon film over the entire surface area of a conductive substrate;

(b) forming a pattern, which contains a movable electrode portion and an elastic support portion coupled to said movable electrode portion in spaced and parallel relation thereto, all over said first polysilicon film by a second polysilicon film of a preselected conductivity type;

(c) forming a low-floor portion as a fixed electrode by etching away that surface region of said conductive silicon substrate which is opposite at least said movable electrode portion and said elastic support portion; and (d) forming on said optical path switching element on said movable electrode portion.

31. The method of claim 30, wherein the conductivity type of said first polysilicon film is opposite to that of said conductive substrate, and said step (b) comprises the steps of:

(b-1) forming an $SiO_2$ film all over said first polysilicon film and making holes in said $SiO_2$ film at positions where to couple said elastic support portion to said conductive substrate, said holes extending down to said first polysilicon film;

(b-2) forming said second polysilicon film all over said $SiO_2$ film; and (b-3) selectively etching away said second polysilicon film to form a pattern having a plurality of through holes and containing said movable electrode portion and said elastic support portion.

32. The method of claim 31, wherein said step (c) comprises the steps of:

(c-1) forming an $SiO_2$ protective film over the entire areas of the surface and underside of said conductive silicon substrate;

(c-2) forming apertures which extend through said $SiO_2$ protective film and down to said first polysilicon film inside said through holes;

(c-3) etching away said first polysilicon film on that surface region of said conductive substrate opposite said movable electrode portion and said elastic support portion and further etching away said surface region of said conductive substrate to a predetermined depth to form said low-floor portion; and (c-4) removing said $SiO_2$ protective film.

33. The method of claim 30, wherein said step (b) comprises the steps of:

(b-1) forming an $SiO_2$ film all over said first polysilicon;

(b-2) forming said second polysilicon film all over said $SiO_2$ film; and (b-3) selectively etching away said second polysilicon film to form a pattern having a plurality of through holes and containing said movable electrode portion and said elastic support portion.

34. The method of claim 33, wherein said step (c) comprises the steps of:

(c-1) forming an $SiO_2$ protective film over the entire areas of the surface and underside of said conductive silicon substrate;

(c-2) forming apertures which extend through said $SiO_2$ protective film and down to said first polysilicon film inside said through holes;

(c-3) etching away said first polysilicon film on that surface region of said conductive substrate opposite said movable electrode portion and said elastic support portion and further etching away said surface region of said conductive substrate to a predetermined depth to form said low-floor portion; and (c-4) removing said $SiO_2$ protective film.

35. The method of claim 30, 31, or 33, wherein said optical switching element is a micro mirror, and said step (d) comprises the steps of:

(d-1) forming a plating seed metal land on said movable electrode portion at the position where to form said micro mirror;

(d-2) forming a resist layer over the entire surface area of said silicon substrate and exposing part of said seed metal land by making a hole of the same shape as said micro mirror in said resist layer at the position where to form said micro mirror;

(d-3) filling said hole with metal for said micro mirror by plating; and (d-4) removing said resist layer.

* * * * *